(12) United States Patent
Chun

(10) Patent No.: US 10,505,783 B2
(45) Date of Patent: Dec. 10, 2019

(54) TERMINAL AND V2X COMMUNICATION METHOD THEREOF IN V2X COMMUNICATION SYSTEM

(71) Applicant: LG ELECTRONICS INC., Seoul (KR)

(72) Inventor: Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 15/739,977

(22) PCT Filed: Jun. 30, 2016

(86) PCT No.: PCT/KR2016/007064
§ 371 (c)(1),
(2) Date: Dec. 26, 2017

(87) PCT Pub. No.: WO2017/003230
PCT Pub. Date: Jan. 5, 2017

(65) Prior Publication Data
US 2018/0191551 A1 Jul. 5, 2018

Related U.S. Application Data

(60) Provisional application No. 62/186,424, filed on Jun. 30, 2015, provisional application No. 62/194,809, filed on Jul. 20, 2015.

(51) Int. Cl.
*H04L 29/08* (2006.01)
*H04W 76/20* (2018.01)
(Continued)

(52) U.S. Cl.
CPC .. *H04L 29/08864* (2013.01); *H04L 29/08009* (2013.01); *H04L 67/12* (2013.01);
(Continued)

(58) Field of Classification Search
None
See application file for complete search history.

(56) References Cited

U.S. PATENT DOCUMENTS

2006/0146858 A1* 7/2006 Kim ............... H04W 72/005
370/432
2006/0187844 A1* 8/2006 Chun ............... H04L 1/1812
370/242
(Continued)

FOREIGN PATENT DOCUMENTS

KR 1020070100270 10/2007
KR 101276024 7/2013
(Continued)

OTHER PUBLICATIONS

PCT International Application No. PCT/KR2016/007064, Written Opinion of the International Searching Authority dated Sep. 12, 2016, 26 pages.
(Continued)

*Primary Examiner* — Michael J Moore, Jr.
(74) *Attorney, Agent, or Firm* — Lee Hong Degerman Kang & Waimey

(57) ABSTRACT

Disclosed is a communication method, wherein: protocol entity configuration information is received from a network entity; if an SDU the transmission of which has been requested by an application is received, a first protocol entity creates a first protocol PDU according to the protocol entity configuration information, without concatenation or segmentation of the SDU; a second protocol entity creates a second protocol PDU on the basis of the first protocol PDU; and a third protocol entity transmits the second protocol PDU to the network entity.

7 Claims, 18 Drawing Sheets

(51) Int. Cl.
  *H04W 76/27* (2018.01)
  *H04W 4/40* (2018.01)
(52) U.S. Cl.
  CPC ........... *H04W 76/20* (2018.02); *H04W 76/27* (2018.02); *H04L 69/321* (2013.01); *H04W 4/40* (2018.02)

(56) References Cited

U.S. PATENT DOCUMENTS

| | | | | |
|---|---|---|---|---|
| 2009/0103511 | A1* | 4/2009 | Marinier | H04L 47/36 |
| | | | | 370/345 |
| 2009/0238124 | A1* | 9/2009 | Pragada | H04L 49/90 |
| | | | | 370/329 |
| 2009/0238129 | A1* | 9/2009 | Park | H04W 76/22 |
| | | | | 370/329 |
| 2010/0278111 | A1* | 11/2010 | Kashima | H04W 28/065 |
| | | | | 370/328 |
| 2014/0050193 | A1* | 2/2014 | Cho | B60W 50/085 |
| | | | | 370/329 |
| 2014/0098761 | A1* | 4/2014 | Lee | H04W 74/006 |
| | | | | 370/329 |
| 2015/0188680 | A1* | 7/2015 | Li | H04W 28/08 |
| | | | | 370/329 |
| 2015/0305012 | A1* | 10/2015 | Yi | H04L 67/1078 |
| | | | | 370/329 |
| 2016/0285935 | A1* | 9/2016 | Wu | H04W 4/90 |
| 2016/0308776 | A1* | 10/2016 | Ozturk | H04L 47/365 |

FOREIGN PATENT DOCUMENTS

| | | |
|---|---|---|
| KR | 1020140031918 | 3/2014 |
| KR | 1020150064196 | 6/2015 |

OTHER PUBLICATIONS

LG Electronics, et al., "New SI proposal: Feasibility Study on LTE-based V2X Services", 3GPP TSG RAN WG1 Meeting #68, RP-151109, Jun. 2015, 7 pages.

* cited by examiner (a)

(b)

(a)

(b)

(a)

(b)

(a)

(b)

TERMINAL AND V2X COMMUNICATION METHOD THEREOF IN V2X COMMUNICATION SYSTEM

CROSS-REFERENCE TO RELATED APPLICATIONS

This application is the National Stage filing under 35 U.S.C. 371 of International Application No. PCT/KR2016/007064, filed on Jun. 30, 2016, which claims the benefit of U.S. Provisional Application Nos. 62/186,424, filed on Jun. 30, 2015 and 62/194,809, filed on Jul. 20, 2015, the contents of which are all hereby incorporated by reference herein in their entirety.

TECHNICAL FIELD

The present invention relates to a wireless communication system, and more particularly, to a communication method performed by a user equipment in a vehicle to everything (V2X) communication system and user equipment for the same.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Tasks

An object of the present invention is to provide a communication mechanism between a user equipment (UE) and a network entity in a V2X communication system.

Another technical task of the present invention is to enable QoS (quality of service) management suitable for an application type and communication environment by selectively activating functions according to a layer and operations of a user equipment according to the application type.

The other technical task of the present invention is to provide an optimized access procedure between a user equipment and a network entity according to a node deployment structure appropriate for V2X communication environment.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of performing communication, which is performed by a UE (user equipment) with a network entity in wireless communication environment, includes the steps of receiving protocol entity configuration information from the network entity, receiving an SDU (service data unit) requested by an application of the UE in a first protocol entity of the UE, generating a first protocol PDU (protocol data unit) in the first protocol entity according to the protocol entity configuration information indicating an operation of the first protocol entity without performing concatenation or segmentation on the SDU, forwarding the first protocol PDU to a second protocol entity from the first protocol entity, generating a second protocol PDU in the second protocol entity based on the first protocol PDU, and transmitting the second protocol PDU to the network entity in a third protocol entity of the UE.

The first protocol entity may correspond to an RLC (radio link control) layer, the second protocol entity may correspond to a MAC (medium access control) layer, and the third protocol entity may correspond to a PHY (physical) layer.

The protocol entity configuration information can indicate whether or not two or more first protocol SDUs (service data units) are included in the first protocol PDU.

The protocol entity configuration information can indicate whether or not a first protocol SDU is included in two or more first protocol PDUs in a manner of being divided.

The protocol entity configuration information can indicate whether or not two or more second protocol SDUs, which are received from first protocol entities different from each other, are included in one second protocol PDU.

The protocol entity configuration information can indicate how often the first protocol entity forwards the first protocol PDU to the second protocol entity.

The protocol entity configuration information can differently indicate whether or not the second protocol entity applies multiplexing according to a logical channel.

The protocol entity configuration information can be received via dedicated RRC (radio resource control) signaling.

The communication environment may correspond to V2X (vehicle to everything) communication environment, the application may correspond to a V2X application, and the protocol entity configuration information may correspond to V2X configuration information.

To further achieve these and other advantages and in accordance with the purpose of the present invention, according to a different embodiment, a method of performing communication, which is performed by a UE (user equipment) with a network entity in wireless communication environment, includes the steps of receiving protocol entity configuration information from the network entity, receiving an SDU (service data unit) requested by an application of the UE in a first protocol entity of the UE, generating a first protocol PDU (protocol data unit) in the first protocol entity based on the SDU, forwarding the first protocol PDU to a second protocol entity from the first protocol entity, generating a second protocol PDU in the second protocol entity according to the protocol entity information indicating an operation of the second protocol entity without performing multiplexing on the first protocol PDU, and transmitting the second protocol PDU to the network entity in a third protocol entity of the UE.

To further achieve these and other advantages and in accordance with the purpose of the present invention, according to a further different embodiment, a UE (user equipment) performing communication with a network entity in V2X (vehicle to everything) communication environment includes a transmitter, a receiver, and a processor configured to operate in a manner of being connected with the transmitter and the receiver, the processor configured to receive protocol entity configuration information from the network entity, the processor configured to receive an SDU (service data unit) requested by an application of the UE in a first protocol entity of the UE, the processor configured to generate a first protocol PDU (protocol data unit) in the first protocol entity according to the protocol entity configuration information indicating an operation of the first protocol entity without performing concatenation or segmentation on the SDU, the processor configured to forward the first protocol PDU to a second protocol entity from the first protocol entity, the processor configured to generate a second protocol PDU in the second protocol entity based on the first protocol PDU, the processor configured to transmit the second protocol PDU to the network entity in a third protocol entity of the UE.

To further achieve these and other advantages and in accordance with the purpose of the present invention, according to a further different embodiment, a UE (user equipment) performing communication with a network entity in V2X (vehicle to everything) communication environment includes a transmitter, a receiver, and a processor configured to operate in a manner of being connected with the transmitter and the receiver, the processor configured to receive protocol entity configuration information from the network entity, the processor configured to receive an SDU (service data unit) requested by an application of the UE in a first protocol entity of the UE, the processor configured to generate a first protocol PDU (protocol data unit) in the first protocol entity based on the SDU, the processor configured to forward the first protocol PDU to a second protocol entity from the first protocol entity, the processor configured to generate a second protocol PDU in the second protocol entity according to the protocol entity information indicating an operation of the second protocol entity without performing multiplexing on the first protocol PDU, the processor configured to transmit the second protocol PDU to the network entity in a third protocol entity of the UE.

Advantageous Effects

As is apparent from the above description, the embodiments of the present invention have the following effects.

First, a UE can perform efficient V2X communication with network entities in a V2X communication system.

Second, since it is able to process a data packet customized for a specific application according to a layer of a user equipment, it is able to perform communication to which a purpose and a characteristic of V2X communication are reflected.

Third, since an access procedure and a registration procedure between a user equipment and a network entity are simplified, it is able to efficiently perform communication in V2X communication environment.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Mode for Invention

Figure 1:
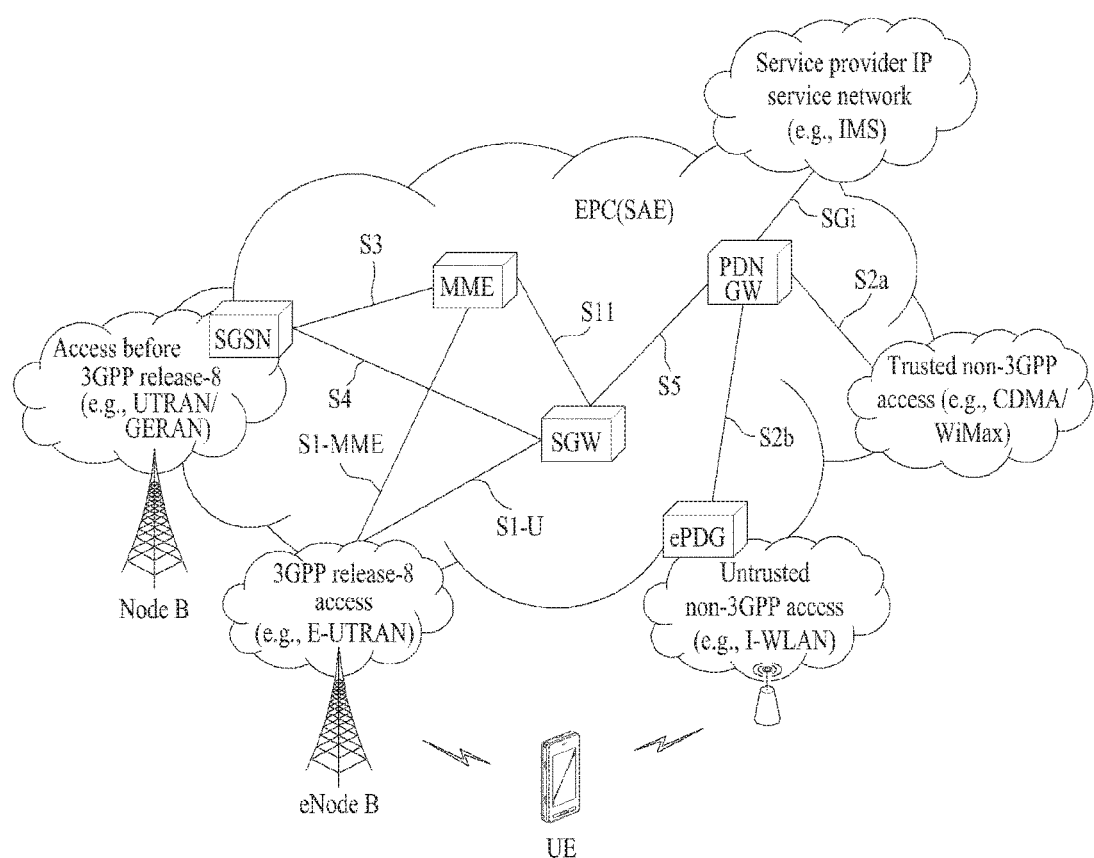
FIG. 1 is a diagram illustrating a brief structure of an evolved packet system (EPS) that includes an evolved packet core (EPC).

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

First of all, the terms used in this specification can be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP(SUPL Location Platform): entity that controls Location Service Management and Position Determination. The SLP includes SLC(SUPL Location Center) function and SPC(SUPL Positioning Center) function. Details of the SLP will be understood with reference to Open Mobile Alliance(OMA) standard document OMA AD SUPL: "Secure User Plane Location Architecture".

USD(User Service Description): application/service layer transmits USD, which includes TMGI(Temporary Mobile Group Identity) for each MBMS service, start and end time of session, frequencies, and MBMS service area identities(MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Mission Critical Push To Talk: a group communication service that provides a fast establishment time, a capability capable of processing a large scaled group, powerful security, and priority handling.

ANDSF (Access Network Discovery and Selection Function): This is one of network entities for providing a policy for discovering and selecting an access that can be used by a UE on an operator basis.

ISRP (Inter-System Routing Policy): This is a protocol defined by the operator to indicate which one will be used by the UE for routing of IP traffic among several radio access interfaces. The ISRP may include three types of protocols as follows, as a policy for defining an access network preferred (i.e., having a high priority) or restricted to route/steer a packet service (or an IP flow or IP traffic or applications). That is, the ISRP may be divided into an IP flow mobility (IFOM) protocol, a multi access PDN connectivity (MAPCON) protocol, and a non-seamless WLAN offload (NSWO) protocol as follows.

IFOM (IP Flow Mobility) protocol: This protocol is in regards to a list in which access technologies/access networks to be used by the UE are arranged according to a priority, when traffic matched to a specific IP traffic filter can be routed on a specific APN or on a random APN. Further, this protocol may designate for which radio access the traffic matched to the specific IP traffic filter is limited on the specific APN or on the random APN.

MAPCON (Multi Access PDN Connectivity) protocol: This protocol is a list in which the access technologies/access networks to be used by the UE are arranged according to the priority when a PDN connection for the specific APN can be routed. Further, this protocol may designate for which radio access a PDN connection to a specific APN will be limited.

NSWO(Non-seamless WLAN offload) protocol: This protocol designates whether certain traffic will be offloaded or not offloaded non-seamlessly to a WLAN.

ISMP (Inter-System Mobility Policy): This is a set of protocols defined by an operator to have an impact on an inter-system mobility decision made by the UE. When the UE can route IP traffic on a single radio access interface, the UE may use ISMP to select the most appropriate access technology type or access network in a given time.

RAN rule: This is a rule received from the network and is called RAN support information. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. Alternatively, when the RAN rule for moving the traffic to the 3GPP access is satisfied, the AS layer of the UE delivers a move-traffic-from-WLAN indication to the higher layer of the UE. 3GPP. 3GPP TS 23.401, TS 23.060, TS 23.402, TS 36.300, TS 36.304, TS 36.331, TS 25.304, and TS 25.331 may be incorporated herein for detailed descriptions on the RAN rule.

Local Operating Environment Information: This is a set of implementation specific parameters which describe the local environment in which the UE is operating.

Network-Based IP Flow Mobility(NBIFOM): This is IP flow mobility based on network based mobility protocol (GTP or PMIP).

UE-initiated NBIFOM: This is NBIFOM in which the UE initiates IP flow mobility.

Network-initiated NBIFOM: This is NBIFOM in which the network initiates IP flow mobility.

Multi-access PDN connection: This is a PDN connection in which traffic can be routed through the 3GPP access and/or the WLAN access. Each IP flow is routed only through one access at one instance.

Routing filter: This is a set of IP header parameter values/ranges of a packet flow used to identify IP flow for the purpose of routing.

Routing access type: This is a type of an access for routing a set of IP flows of PDN connection (3GPP access or WLAN access.

Routing Rule (RR): This is a set of information that enables association between the routing filter and the routing access type.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
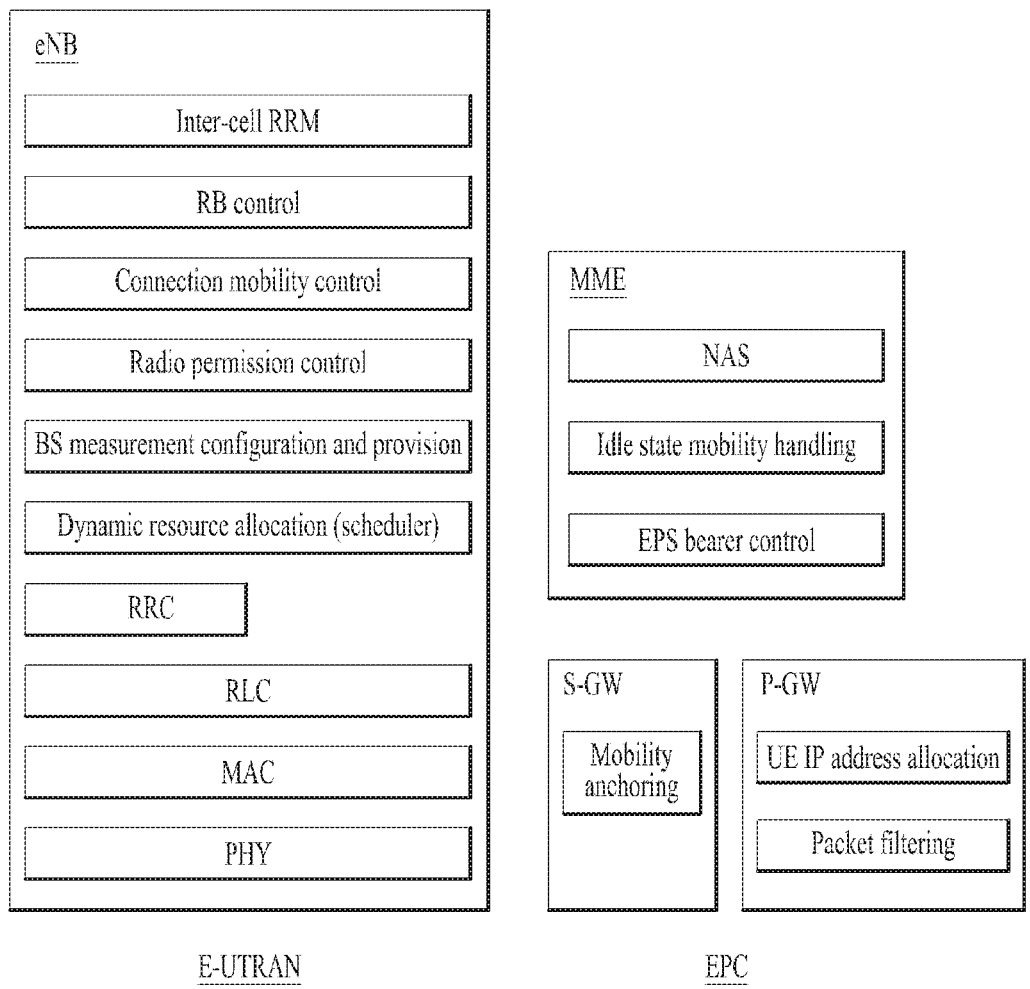
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE _IDLE state management, ciphering of the user plane, SAE bearer control, and ciphering and integrity protection of NAS signaling.

Figure 3:
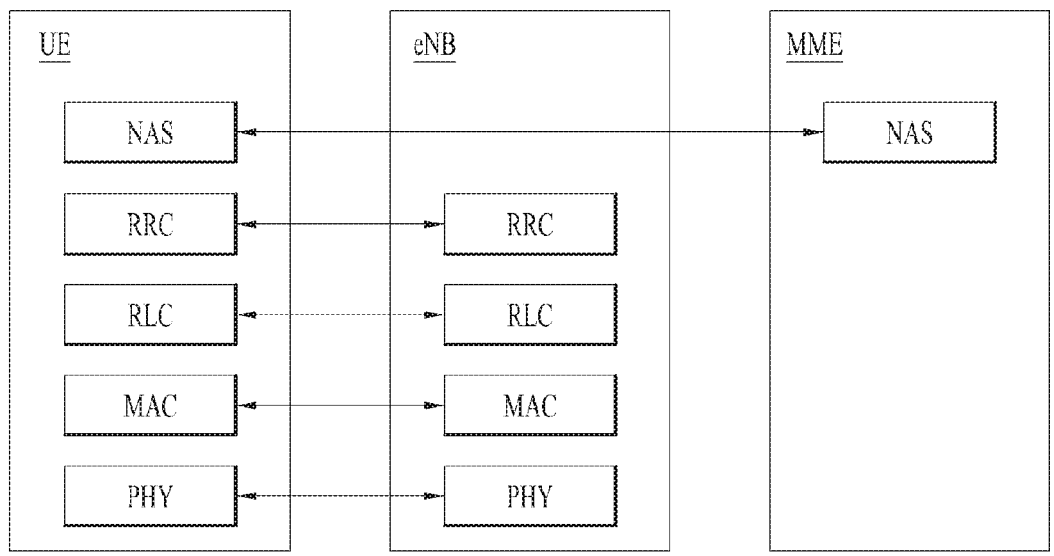
FIG. 3 is an exemplary diagram illustrating a structure of a radio interface protocol on a control plane.
Figure 4:
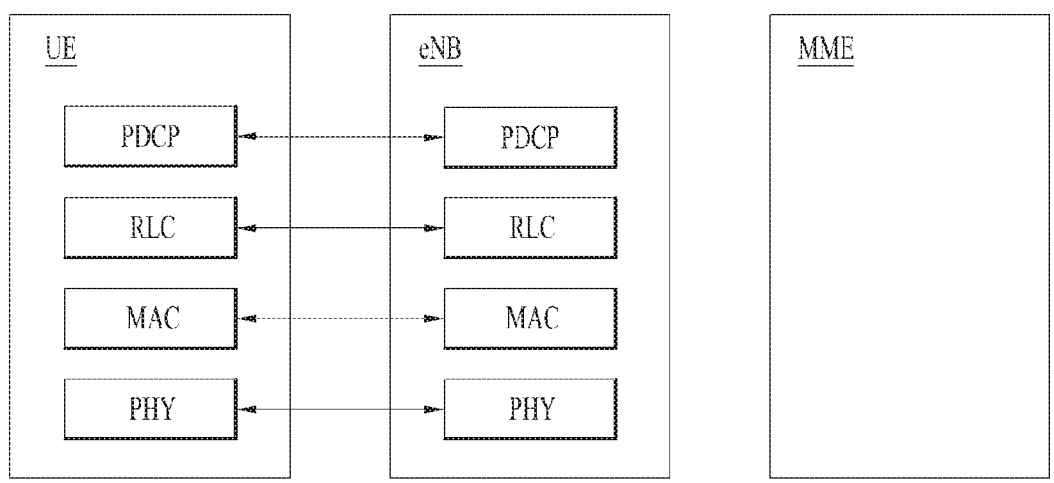
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
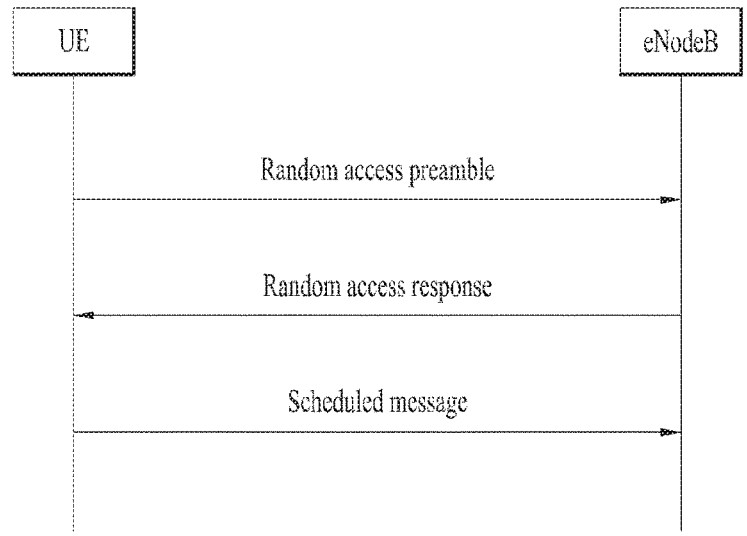
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB transmits a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
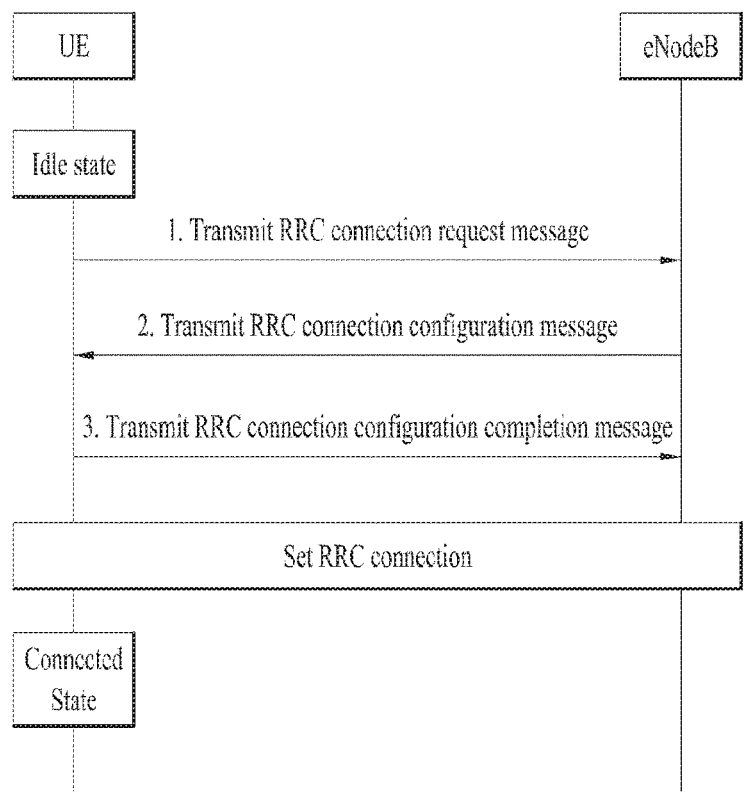
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

When the UE in the idle state desires to establish RRC connection for reasons such as an attempt to make a call, a data transmission attempt, or a response of the eNodeB to paging, the UE transmits an RRC connection request message to the eNodeB first.

Upon receiving the RRC connection request message from the UE, the ENB accepts the RRC connection request of the UE when the radio resources are sufficient, and then transmits an RRC connection setup message, which is a response message, to the UE.

Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. V2X (Vehicle to Everything) Communication

Figure 7:
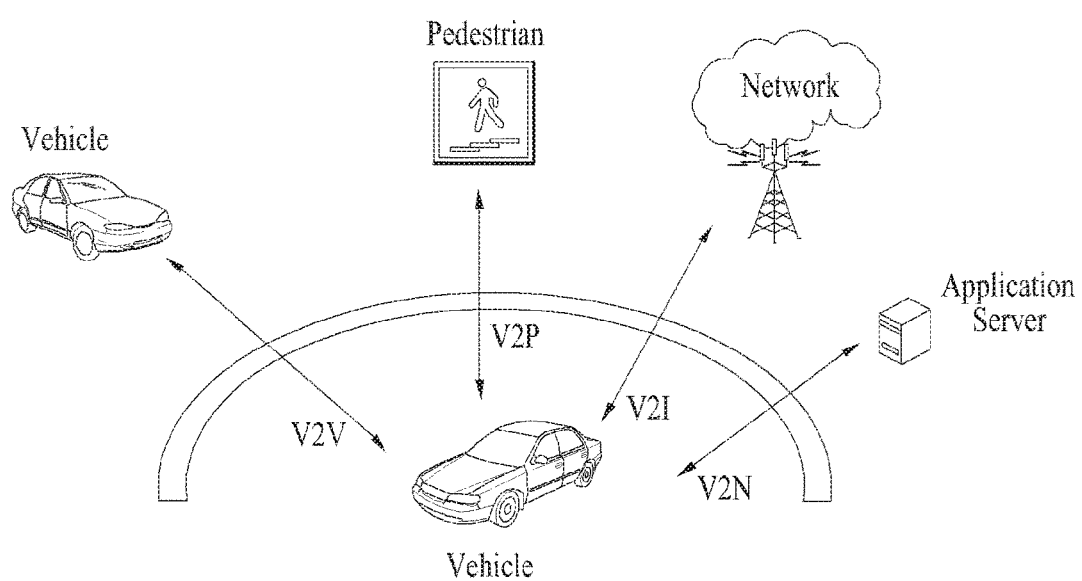
FIG. 7 is a diagram showing a V2X (vehicle to everything) communication environment.

FIG. 7 is a diagram showing a V2X (vehicle to everything) communication environment.

If a vehicle accident occurs, many lives are lost and serious property damage is caused. Hence, the demand for a technology capable of securing pedestrian's safety as well as vehicle boarded person's safety is increasingly rising. Hence, a vehicle-specified hardware and software based technology is grafted onto a vehicle.

An LTE based V2X (vehicle-to-everything) communication technology having started from 3GPP reflects the tendency of grafting an IT (information technology) technology onto a vehicle. Connectivity function is applied to some kinds of vehicles, and many efforts are continuously made to research and develop V2V (Vehicle-to-Vehicle) communication, V2I (Vehicle-to-Infrastructure) communication, V2P (Vehicle-to-Pedestrian) communication, and V2N (Vehicle-to-Network) communication through evolution of communication functions.

According to V2X communication, a vehicle consistently broadcasts information on its own locations, speeds, directions, etc. Having received the broadcasted information, a nearby vehicle utilizes the information for accident prevention by recognizing movements of other vehicles moving nearby.

Namely, in a similar manner that an individual person carries a user equipment in shape of a smartphone, a smartwatch or the like, a user equipment (hereinafter abbreviated UE) in specific shape is installed in each vehicle. Here, a UE installed in a vehicle means a device actually provided with a communication service from a communication network. For example, the UE installed in the vehicle can be provided with a communication service by being connected to an eNB.

Yet, various items should be considered for a process for implementing V2X communication in a vehicle. This is because astronomical costs are required for the installation of traffic safety facilities such as V2X base station and the like. Namely, in order to support V2X communication on all vehicle-movable roads, it is necessary to install hundreds or thousands of V2X base stations or more. Moreover, since each network node accesses Internet or a central control server using a wired network basically for stable communication with a server, installation and maintenance costs of the wired network are high.

Prior to the description of the proposed V2X communication method, several kinds of terms to be used in the following specification are defined first.

RSU (road side unit): This is an entity supportive of V2I communication and means an entity capable of performing a transmission/reception to/from a UE using a V2I application. The RSU can be implemented in an eNB or UE (particularly, a stationary UE). An eNB or UE operating as RSU collects information (e.g., traffic light information, traffic volume information, etc.) related to traffic safety and/or information on nearby vehicle movement, transmits information to another UE becoming a target of V2I communication, and receives information from another UE.

V2I communication: This is a type of V2X communication. A UE and RSU that use V2I application become main agents of the communication.

V2N communication: This is a type of V2X communication. A UE and serving entity that use V2N application become main agents of the communication and communicate with each other through an LTE network entity.

V2P communication: This is a type of V2X communication. Two UEs that use V2P application become main agents of the communication.

V2V communication: This is a type of V2X communication. Two UEs that use V2V application become main agents of the communication. V2V communication differs from V2P communication in the following. In the V2P communication, a prescribed UE becomes a UE of a pedestrian. In the V2V communication, a prescribed UE becomes a UE of a vehicle.

Uu interface (or, E-UTRAN Uu interface): This means an interface between a UE and an eNB defined in LTE/LTE-A. With respect to a relay node, this interface may mean an interface between a relay node and a UE.

Un interface: This means an interface between a relay node and an eNB. This interface means an interface used for transmission and reception performed in MBSFN (MBMS (multimedia broadcast/multicast services) over single frequency network) subframe.

PC5 interface: This means an interface used for direct communication between two UEs. This interface is used for communication between devices supportive of ProSE (proximity service).

DSRC (dedicated short range communications): This means a protocol and standard specification used for short-range or medium-range wireless communication for vehicles. Communication is performed using an interface different from the Uu, Un and PC5 interfaces.

3. Function and Operation according to Layer

Figure 8:
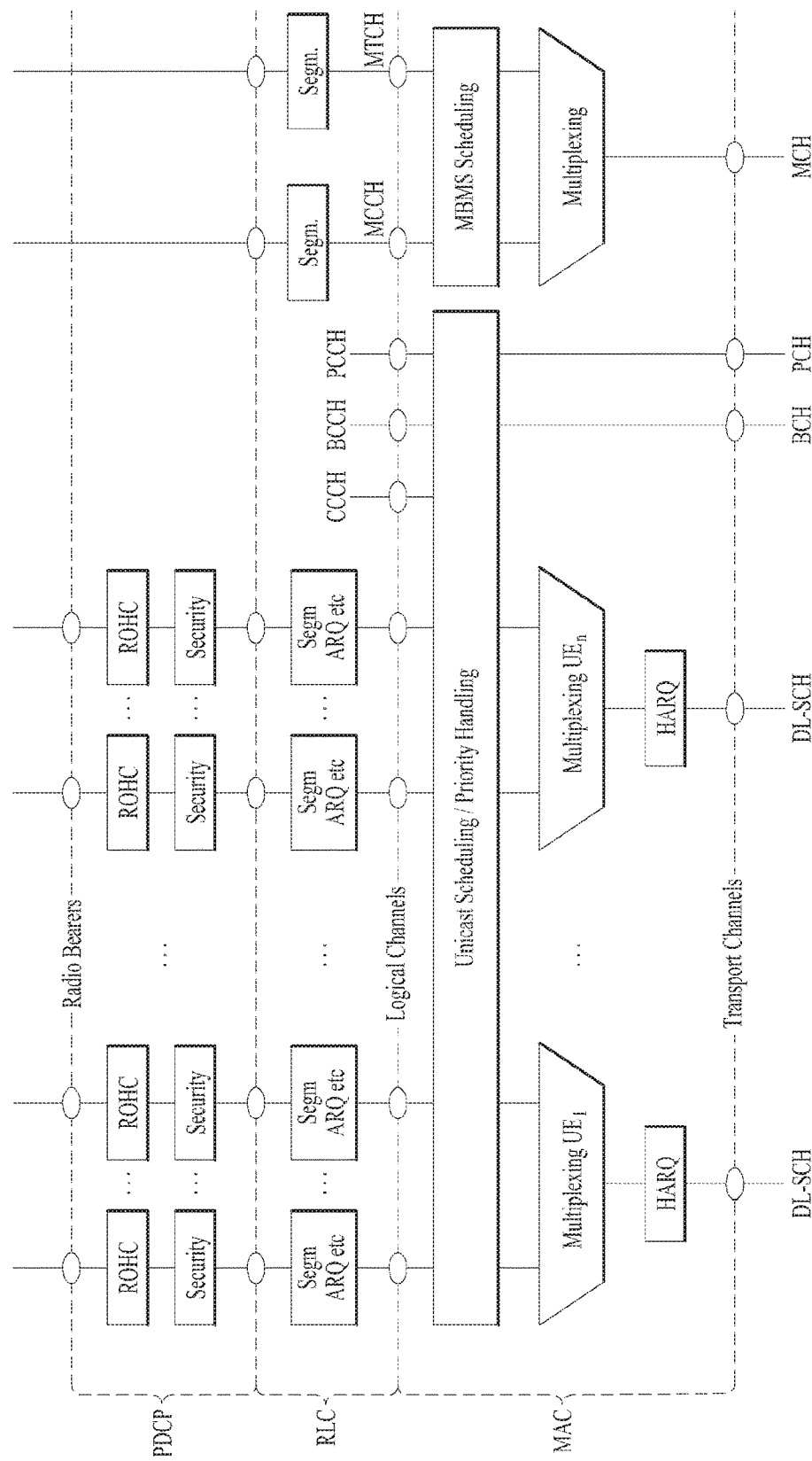
FIG. 8 is a diagram illustrating a layer 2 structure for DL.
Figure 9:
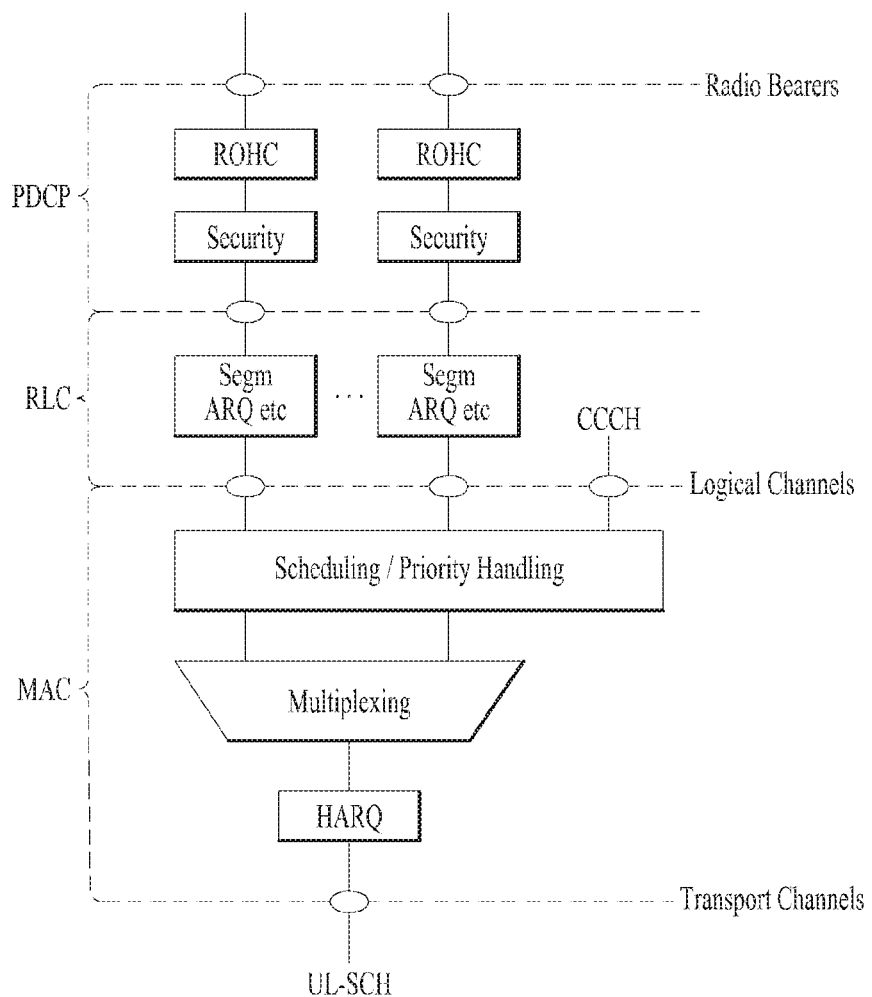
FIG. 9 is a diagram illustrating a layer 2 structure for UL.
Figure 10:
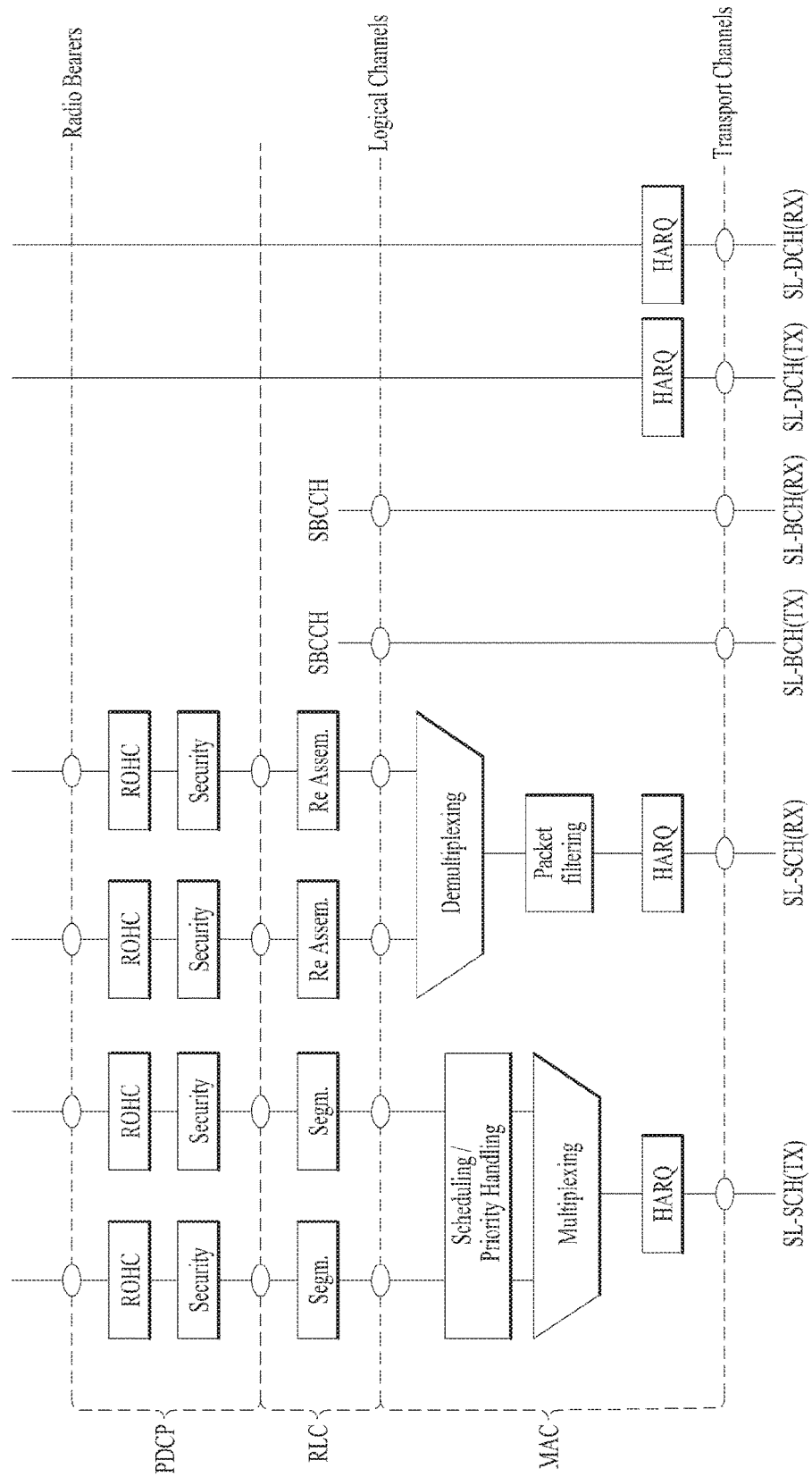
FIG. 10 is a diagram illustrating a layer 2 structure for sidelink.

In the following, functions and operations of each layer in the protocol structure mentioned earlier in FIGS. 3 and 4 are explained in detail. FIGS. 8 to 10 show a layer 2 structure for a downlink/uplink/sidelink, respectively. The layer 2 structure is divided into sublayers including a MAC layer, an RLC layer, and a PDCP layer.

First of all, as mentioned in the foregoing description, the MAC layer is in charge of an operation of multiplexing a logical channel with a transmission channel (i.e. transport block (TB)). The multiplexing function corresponds to a function for efficiently using a radio resource. The MAC layer is also in charge of an operation of demultiplexing a logical channel from a transmission channel as an operation opposite to the multiplexing function.

A traffic logical channel for transmitting actual data and a control logical channel for transmitting and receiving control information of a communication configuration are set to a UE. In particular, if various types of services (e.g., voice service, internet service, streaming service, etc.) are in use in a UE, a plurality of logical channels are set to the UE to provide QoS suitable for each of the services. For example, the internet service is insensitive to data transmission delay but is sensitive to packet loss. The voice service is insensitive to packet loss but is sensitive to data transmission delay. The streaming service accepts the loss of several packets and is very insensitive to transmission delay. In particular, since each of the service requires a different QoS, each of the service is mapped to a different logical channel.

In this case, the timing at which data is actually transmitted is different from each other according to each of a plurality of logical channels. And, when a base station allocates a radio resource to a UE, it is difficult for the base station to match an amount of the radio resource with an amount of data to be transmitted by the UE. For example, although it is able to divide the amount of data to be transmitted by the UE in a unit of 1 byte, the amount of radio resource allocated to the UE can be divided in a unit of 100 bytes for example. Of course, although it is able to configure the base station to allocate a radio resource to the UE in a unit of 1 byte, it may have a burden that a size of control information, which is transmitted to the UE by the base station to allocate the radio resource, is increasing.

For example, assume a case that data as much as 1150 bytes are stacked on a logical channel 1 of a UE and data as much as 1300 bytes are stacked on a logical channel 2 of the UE. In this case, if a base station allocates a radio resource to the UE to enable the UE to transmit data as much as 2000 bytes, the UE can use the resource of 2000 bytes according to 3 schemes described in the following. As a first scheme, the UE transmits the data of 1150 bytes stacked on the logical channel 1 and may fill the remaining 850 bytes with padding data (meaningless data). As a second scheme, the UE transmits the data of 1300 bytes stacked on the logical channel 2 and may fill the remaining 700 bytes with padding data. As a third scheme, the UE can transmit data of 2000 bytes by mixing the data of the logical channel 1 with the data of the logical channel 2. Among the three schemes, since the third scheme is most efficient in terms of radio resource utilization, LTE/LTE-A standard is designed to operate according to the third scheme. This sort of scheme corresponds to multiplexing processed in the MAC layer.

Subsequently, as mentioned in the foregoing description, the RLC layer performs an operation of controlling a data size to make a lower layer easily transmit data by segmenting and concatenating data. The segmentation and the concatenation correspond to an operation similar to the multiplexing performed in the MAC layer. The multiplexing corresponds to a process of combining channel data into a single data unit, whereas the segmentation and the concatenation correspond to a process of configuring data units different from each other as a new data unit in the same logical channel.

Specifically, the concatenation corresponds to a process of combining data units different from each other received from a higher layer to match a size of the data units with a size of a data unit to be delivered to a lower layer. The segmentation corresponds to a process of segmenting data units received from a higher layer to match a size of the data units with a size of a data unit to be delivered to a lower layer.

As mentioned in the foregoing description, when an IP packet is transmitted, the PDCP layer performs a header compression function to reduce a header size of the IP packet. And, the PDCP layer also performs an encryption function to prevent data intercept of a third party.

In the foregoing description, the multiplexing function, the segmentation function, and the concatenation function performed in the MAC layer and the RLC layer have been explained. The functions contribute to the efficient allocation of a radio resource allocated to a plurality of terminals and a plurality of logical channels handled by a single base station.

For example, assume that a UE 1 corresponding to a UE of a general user generates a packet of 100 bytes at the timing of t0 and generates a packet of 200 bytes at the timing of t3 and a UE 2 corresponding to a UE of a police officer generates a packet of 200 bytes at the timing of t1 and generates a packet of 200 bytes at the timing of t2. In this case, a base station can allocate a resource to the two UEs using two schemes. As a first scheme, the base station can allocate a radio resource to the UEs as soon as possible. In particular, the base station allocates a radio resource of 100 bytes to the UE 1 at the timing of t0, allocates a radio resource of 200 bytes to the UE 2 at the timing of t1, allocates a radio resource of 200 bytes to the UE 2 at the timing of t2, and allocates a radio resource of 200 bytes to the UE 1 at the timing of t3.

As a second scheme, the base station can determine the minimum amount of data allocated to a UE. For example, it may be able to configure the base station to allocate a radio resource to a UE only when the UE generates data equal to or greater than 250 bytes. According to the second scheme, the base station allocates a radio resource of 400 bytes to the UE 2 at the timing of t2 and allocates a radio resource of 300 bytes to the UE 1 at the timing of t3. Among the two schemes, an operation of the second scheme is more reasonable in consideration of transmission overhead of a message for allocating a radio resource and a priority of a UE.

4.1 Function and Operation according to Layer in V2X Communication Environment

The aforementioned V2X communication environment includes both a transportation infrastructure including a vehicle UE and an RSU and communication performed between general pedestrians. A vehicle informs surrounding vehicles of a speed and direction information of the vehicle or collects information on movements of the surrounding vehicles by exchanging information between the objects. By doing so, each of the vehicles can prevent a collision and sense a danger of a pedestrian, thereby reducing a danger of traffic accident.

According to the contents defined by such an organization defining V2X application-related regulation as IEEE, SAE (Society of Automotive Engineers), ETSI (European Telecommunications Standards Institute), and the like, it is regulated to generate a message related to traffic safety maximum 10 times in a second, i.e., with a frequency equal to or less than 10 Hz, in a V2X application layer. And, a maximum delivery delay of each V2X message is regulated by 100 ms.

In particular, a V2X message, which is generated in the V2X application layer with a frequency of maximum 10 Hz, is transmitted through a V2X transmission layer, e.g., LTE/LTE-A communication protocol. When the V2X message is transmitted via the communication protocol, if the V2X transmission layer fails to possess appropriate context information, an error may occur and the error may interrupt traffic safety. For example, if the transmission layer does not have information indicating that the transmission layer provides a communication service to a V2X application or LTE/LTE-A protocol configuration information related to V2X communication, the error may occur. In this case, the transmission layer may transmit V2X messages generated at different timing by aggregating the messages to increase communication efficiency. As a result, an error may occur.

For example, a UE 1 generates data of 100 bytes at the timing of t0, generates data of 100 bytes at the timing of t2 (t0+150 ms), and generates data of 100 bytes at the timing of t3 (t0+250 ms) via a V2X logical channel 1. A UE 2 generates data of 200 bytes at the timing of t1 via a non-V2X logical channel 2. Meanwhile, assume a case that a base station allocates a radio resource when data equal to or greater than 200 bytes is stacked in a buffer of a specific UE.

In the abovementioned example, since data of 200 bytes is not stacked in both of the two UEs at the timing of t0, the base station does not allocate a radio resource. Since data equal to or greater than 200 bytes is stacked in the UE 2 at the timing of t1, the base station allocates a radio resource to the UE 2. In this case, both data of the logical channel 1 and data of the logical channel 2 are included in a MAC PDU. Subsequently, since data of 200 bytes is not stacked in both of the two UEs at the timing of t2, the base station does not allocate a radio resource. Since data equal to or greater than 200 bytes is stacked in the UE 1 at the timing of t3, the base station allocates a radio resource to the UE 1.

Although the abovementioned procedure may be efficient in terms of radio resource utilization, the procedure may be inappropriate for the V2X communication environment. Specifically, according to the abovementioned example, data of the logical channel 1 and data of the logical channel 2 are transmitted in a manner of being mixed at the timing of t1. In this case, since the data of the logical channel 1 corresponds to V2X data, there is no problem no matter which vehicle receives the data. On the contrary, since the data of the logical channel 2 corresponds to non-V2X data rather than V2X data, the data of the logical channel 2 should be received by a specifically designated UE only. However, since a MAC PDU transmitted at the timing of t1 includes data of two different characteristics in a single data unit, the MAC PDU is vulnerable to a security problem. And, since a data packet of a different characteristic requires a different error rate, it may cause a problem as well. Moreover, since the V2X data is transmitted via a PC5 interface and the non-V2X data is transmitted via a Uu interface, a case of not multiplexing the two data may occur. In particular, a problem may occur due to the multiplexing function of the MAC layer in V2X communication environment.

Subsequently, V2X data generated at the timing of t2 and V2X data generated at the timing of t3 are transmitted at the timing of t3 in a manner of being combined by one. However, since the V2X data generated at the timing of t2 is transmitted at the timing of t3 elapsed from the t2 more than delivery delay time of 100 ms, it might be a meaningless transmission. In other word, not only delaying transmission of a specific V2 data but also transmitting V2X data corresponding to meaningless transmission may cause a problem of unnecessarily wasting a radio resource and power. In particular, a problem may occur due to the concatenating function of the RLC layer in V2X communication environment.

Moreover, if data of a specific logical channel is transmitted in a manner of being divided due to the segmentation function of the RLC layer, it may be highly probable that a receiving end fails to receive a complete data packet. And, if a data packet is divided, it may indicate that one of logical channels is delayed. Hence, a problem similar to the aforementioned problem may occur. In particular, a problem may occur due to the segmentation function of the RLC layer in V2X communication environment.

In other word, since the legacy function and operation according to layer are unable to appropriately reflect a part of the characteristics of the V2X communication environment, there is a problem that the function and the operation may rather degrade communication performance and efficiency in the V2X communication environment. In the following, a method of solving the problem is proposed.

4.2 Operation Method of UE Proposed in V2X Communication Environment (Embodiment 1)

In the following, an operation method according to a layer is explained in accordance with an embodiment proposed in V2X communication environment. In particular, the present invention proposes a method for a lower communication layer to transmit information generated in a V2X application layer using appropriate QoS.

According to an OSI 7 layer model, a lower transmission layer simply operates without information on a message generated by a higher application layer or information on a usage of an application. According to the embodiment proposed in the present invention, configuration information is forwarded to each transmission layer to guarantee QoS of V2X communication.

Figure 11:
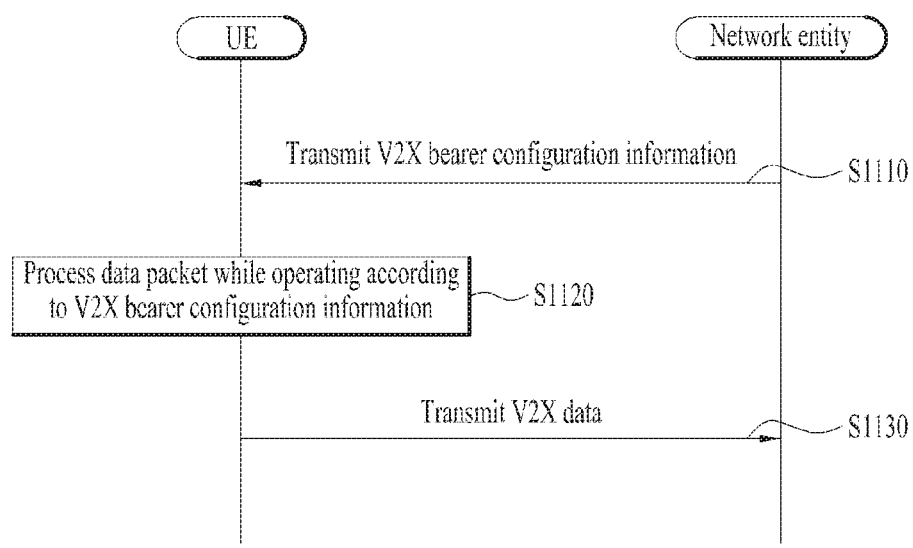
FIG. 11 is a flowchart for an operation method of a UE according to a proposed embodiment.
Figure 12:
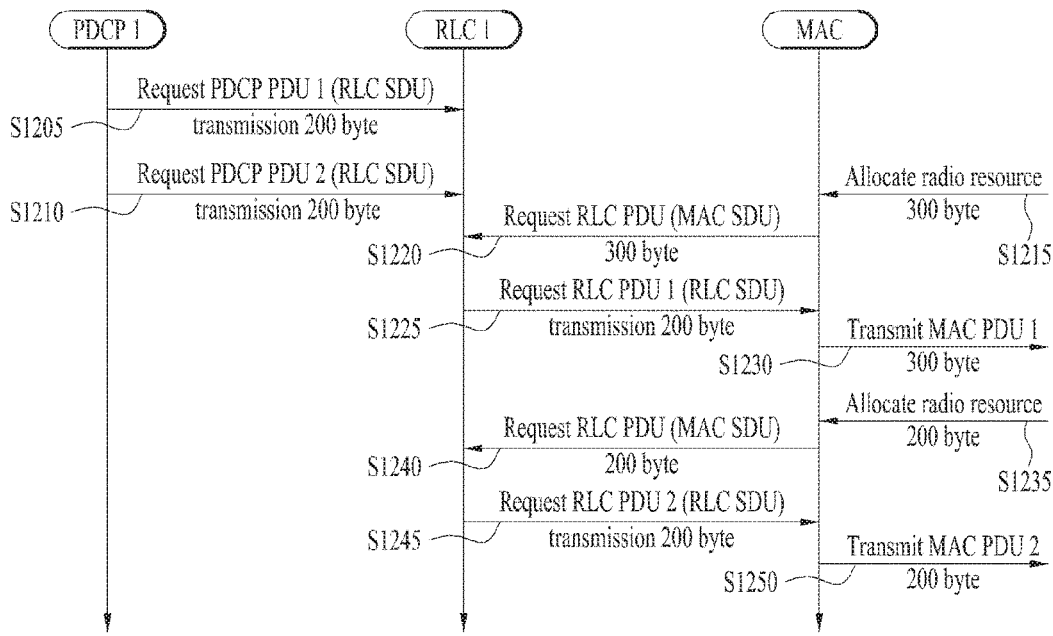
FIG. 12 is a flowchart for an operation method of a UE according to a layer in accordance with a proposed embodiment.
Figure 12:
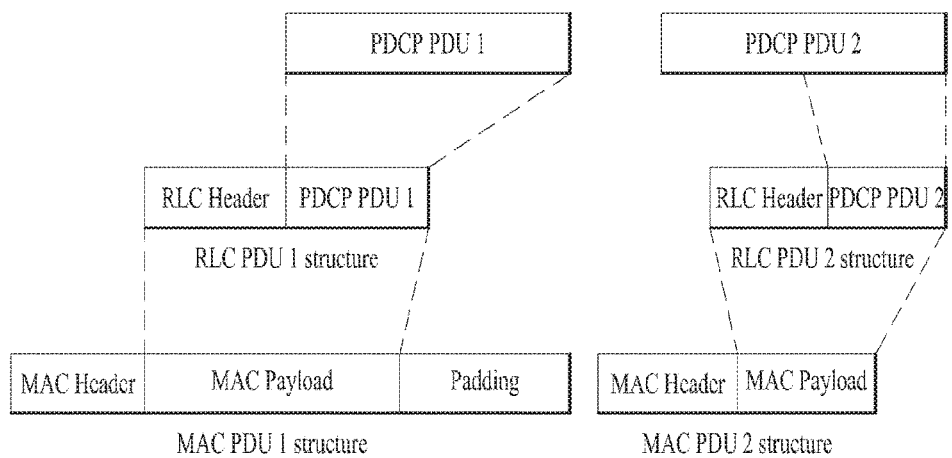
Figure 13:
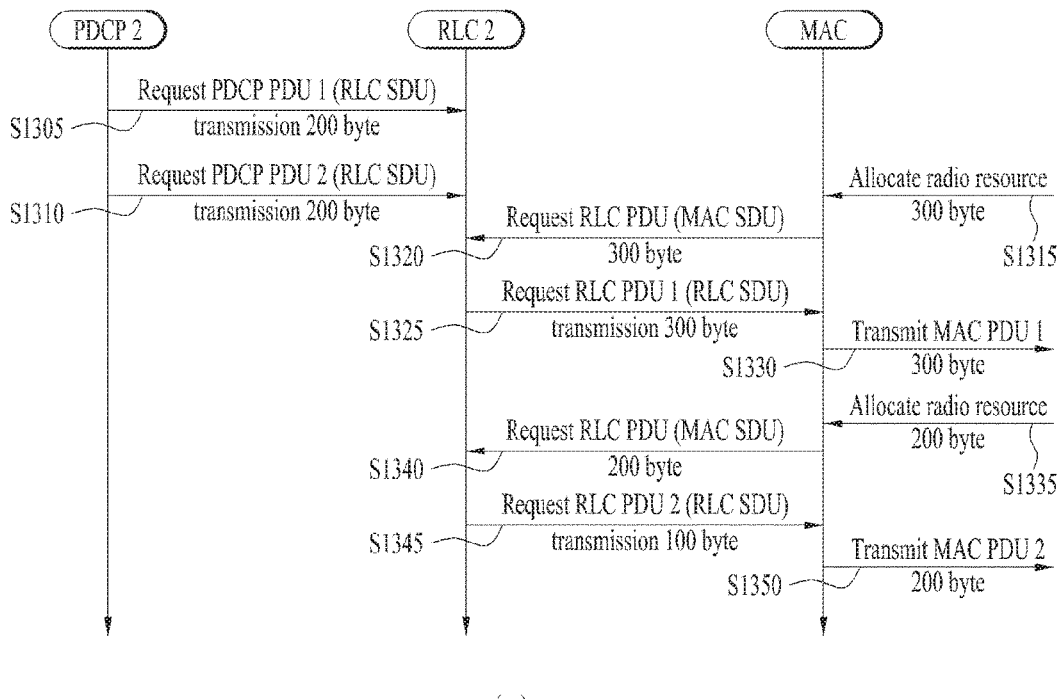
FIG. 13 is a flowchart for an operation method of a UE according to a layer in accordance with a different proposed embodiment.
Figure 13:
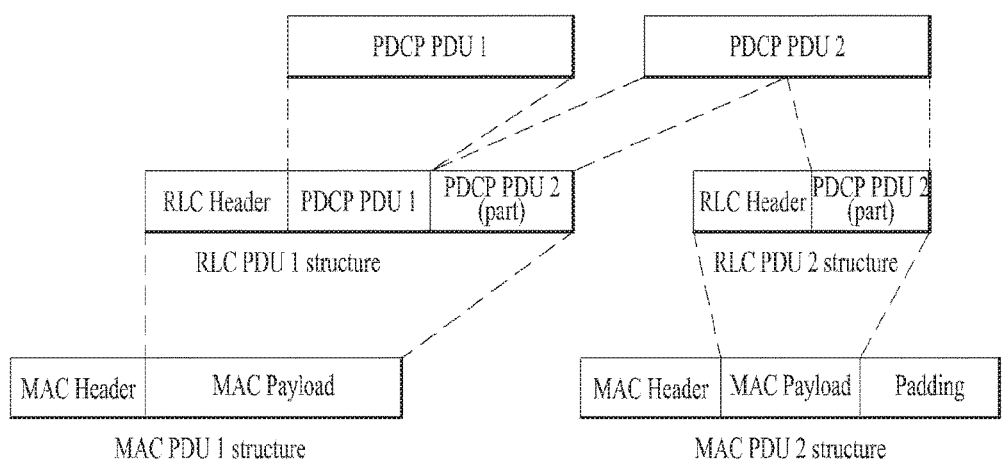

FIG. 11 is a flowchart for an operation method of a UE according to a proposed embodiment.

First of all, a network entity transmits V2X bearer configuration information to a UE to indicate a bearer for forwarding data of a V2X application or a method of processing V2X data in each protocol layer [S1110].

The V2X bearer configuration information can be forwarded to the UE via various schemes and paths. For example, the V2X bearer configuration information can be forwarded to the UE through NAS layer signaling such as an ESM (EPS session management) message or an EMM (EPS mobility management) message and a network node may correspond to a node of a core network such as MME, S-GW, and P-GW. Or, the V2X bearer configuration information can be forwarded to the UE through RRC layer signaling such as an RRC message. The V2X bearer configuration information can be forwarded to the UE in a form of a dedicated RRC message. Or, the V2X bearer configuration information can be commonly forwarded to V2X function-enabled UEs via an SIB (system information block). In this case, a network node may correspond to an eNB.

Meanwhile, the V2X bearer configuration information can include entity configuration information on each of layers. For example, the V2X bearer configuration information can include entity configuration information on each of a PDCP layer, an RLC layer, and a MAC layer.

First of all, entity configuration information on the PDCP layer is explained. The V2X bearer configuration information can include information on whether or not the PDCP layer is able to perform concatenation at the time of configuring a PDCP PDU. For example, the V2X bearer configuration information can include information on whether or not the PDCP PDU is able to include two or more PDCP SDUs (service data units), information on whether or not a single PDCP SDU is included in a PDCP PDU, and the like. If it is configured as only one PDCP is included in a PDCP PDU, the PDCP layer should include maximum one PDCP SDU only in a PDCP PDU at the time of configuring the PDCP PDU.

And, the V2X bearer configuration information can also include information on how often the PDCP layer transmits a PDCP PDU to a lower layer (e.g., RLC layer). For example, if a PDCP entity is configured to forward a PDCO PDU to the RLC layer 10 times in a second, the PDCP entity is unable to forward PDCP PDUs more than 10 to the RLC layer in a second. Or, if the PDCP entity is configured to forward a PDCP PDU to the RLC layer one time in 100 ms, the PDCP entity can forward a next PDCP PDU to the RLC layer only after 100 ms is elapsed from the timing at which a PDCP PDU is forwarded.

Or, the V2X bearer configuration information can include configuration information on whether or not it is able to perform segmentation or concatenation on a PDCP SDU at the time of configuring the PDCP PDU in the PDCP layer.

In the following, entity configuration information on the RLC layer is explained. The V2X bearer configuration information can include information on whether or not the RLC layer is able to perform concatenation at the time of configuring an RLC PDU. For example, the V2X bearer configuration information can include information on whether or not the RLC PDU is able to include two or more RLC SDUs, information on whether or not a single RLC SDU is included in an RLC PDU, and the like. If it is configured as only one RLC SDU is included in an RLC PDU, the RLC layer should include one RLC SDU only in an RLC PDU at the time of configuring the RLC PDU.

As mentioned in the foregoing description, when an RLC entity forwards a data unit to a lower layer (e.g., MAC layer), the RLC entity configures a data unit of a size requested by the lower layer and forwards the data unit to the lower layer. When the data unit of the size requested by the lower layer is configured, the RLC entity uses data blocks received from a higher layer. The RLC entity checks whether or not segmentation and/or concatenation is enabled via the received V2X bearer configuration information. If the segmentation and/or concatenation is enabled (activated), the RLC entity configures a data unit by segmenting a data block or concatenating other data blocks. If the segmentation and/or concatenation is disabled (deactivated), the RLC entity includes one data block only in a data unit and does not segment a data block into other data blocks. The V2X bearer configuration information can separately include information on whether or not the RLC layer is able to concatenate RLC SDUs at the time of configuring an RLC PDU and information on whether or not the RLC layer is able to segment an RLC SDU.

And, the V2X bearer configuration information can also include information on how often the RLC layer transmits an RLC PDU to a lower layer (e.g., MAC layer). For example, if an RLC entity is configured to forward an RLC PDU to the MAC layer 10 times in a second, the RLC entity is unable to forward RLC PDUs more than 10 to the MAC layer in a second. Or, if the RLC entity is configured to forward an RLC PDU to the MAC layer one time in 100 ms, the RLC entity can forward a next RLC PDU to the MAC layer only after 100 ms is elapsed from the timing at which an RLC PDU is forwarded.

Table 2 in the following shows an example that the V2X bearer configuration information is transmitted to a UE in a form of the RRC signaling. In particular, the example shows configuration information on the RLC layer.

TABLE 2

RLC-Config
    The IE RLC-Config is used to specify the RLC configuration of
    SRBs and DRBs.
    RLC-Config information element
-- ASN1START
RLC-Config ::=                                CHOICE {
    am
    SEQUENCE {
        ul-AM-RLC
    UL-AM-RLC,
        dl-AM-RLC
    DL-AM-RLC
    },
......
    Minimum TX_interval
    Enable_segmentation
    Enable_concatenation
    ...
}

The V2X bearer configuration information can also include entity configuration information on the MAC layer. Similar to the configuration information on the PDCP layer and the configuration information on the RLC layer, the V2X bearer configuration information can include configuration information on whether or not the MAC layer is able to concatenate and/or segment a MAC SDU at the time of configuring a MAC PDU. And, the V2X bearer configuration information can also include information on how often a MAC entity forwards a MAC PDU to a lower layer (e.g., PHY layer), information on a maximum delivery number, information on delivery frequency, and the like.

Meanwhile, the V2X bearer configuration information can also include information on whether or not it is able to perform multiplexing on a MAC PDU with data of RLC entities different from each other at the time of configuring the MAC PDU in the MAC layer. And, the V2X bearer configuration information can also include information on whether or not it is able to perform multiplexing on a data of a certain logical channel. For example, if it is forbidden from performing multiplexing on a logical channel 1 among logical channels 1 to 3, a MAC PDU can be configured using 4 schemes described in the following. i) data of the logical channel 1 is included only, ii) data of the logical channel 2 is included only, iii) data of the logical channel 3 is included only, or iv) data of the logical channels 2 and 3 are included together.

And, the V2X bearer configuration information can also include information on a logical channel at which concatenation/segmentation is forbidden. A MAC entity determines an amount of data to be included in a MAC PDU from each logical channel to configure the MAC PDU. In this case, the MAC PDU checks a size of a data block buffered in a logical channel at which concatenation/segmentation is forbidden and then determines a size of data to be assigned to the logical channel In particular, if a data block to be transmitted to the logical channel at which concatenation/segmentation is forbidden exists and a priority of the logical channel is high, the MAC entity includes the data block of the logical channel in the MAC PDU only.

Moreover, in relation to a BSR (buffer status report)/SR (scheduling request), the V2X bearer configuration information can also configure information on a triggering condition at the time of performing the BSR performed by the MAC layer and information on content included in BRS report. For example, when data occurs in a V2X application or a V2X-related protocol entity, the V2X bearer configuration information can include information on whether or not the BSR is triggered, information on whether or not the data is included in the BSR, information on whether or not information on a packet to be firstly transmitted is included in the BSR, and the like. In a broad sense, when an eNB transmits configuration information of each logical channel and a protocol entity (PDCP/RLC/MAC) to a UE, if data additionally arrives at each protocol entity, the eNB can also indicate information on whether or not the BSR is triggered by each protocol entity or information on whether or not information of the data is included in the BSR.

Having received the V2X bearer configuration information, the UE operates according to the V2X bearer configuration information [S1120]. In particular, the UE does not perform an operation banned by the V2X bearer configuration information, performs a permitted operation only according to configured information, and processes a data packet. The UE transmits a V2X-related data packet, which is processed according to the V2X bearer configuration information, to the network entity [1130].

In the foregoing description, an embodiment of transmitting configuration information to a UE according to a layer has been explained. Meanwhile, unlike the embodiment, it may uniformly set a specific operation to a bearer designated for a V2X application. For example, if information indicating that a specific bearer is designated for V2X (or a specific usage) is received from a network or an application, a UE can perform a predetermined operation on each of layers mapped to the specific bearer.

In particular, configuration items for an operation of each of the layers can be replaced with a predetermined value at a time. Specifically, if a specific bearer is designated for V2X, the MAC layer does not perform multiplexing on RLC PDUs different from each other and the RLC layer does not perform concatenation on PDCP PDUs. A predetermined default value can be stored in USIM of a UE, is indicated to a UE via system information, or can be forwarded to the UE using such a procedure as OMA DM.

In the following, when a function and an operation are differently configured according to a logical channel, a detail operation of a UE is explained with reference to FIGS. 12 to 15. In FIGS. 12 to 15, assume that concatenation, segmentation and multiplexing are banned in a logical channel 1 and concatenation, segmentation and multiplexing are permitted in logical channels 2 and 3.

FIGS. 12(a) and (b) show a data transmission process of the logical channel 1. Since concatenation and segmentation are banned in the logical channel 1, each RLC PDU includes one PDCP PDU only (FIG. 12(b)). In order to satisfy a size (300 bytes) of a MAC PDU 1, padding as much as 100 bytes is added to a MAC payload of 200 bytes.

Referring to FIG. 12(a), if transmission requests of a PDCP PDU 1 and a PDCP PDU 2 are received [S1205, S1210], a radio resource for each data packet is allocated to an RLC 1 [S1215, S1235] and the RLC 1 layer receives an RLC PDU request from a MAC layer [S1220, S1240]. The RLC 1 layer configures an RLC PDU 1 and an RLC PDU 2 and forward the RLC PDU 1 and the RLC PDU 2 to the MAC layer [S1225, S1245]. The MAC layer transmits a MAC PDU 1 and a MAC PDU 2 through a PHY layer [S1230, S1250].

FIGS. 13(a) and (b) show a data transmission process of the logical channel 2. Since concatenation and segmentation are permitted in the logical channel 2, one or more PDCP PDUs can be included in an RLC PDU in a manner of being concatenated. Moreover, a PDCP PDU 2 can be segmented into an RLC PDU 1 and an RLC PDU 2 (FIG. 13(b)). The MAC layer transmits a MAC PDU 1 of 300 bytes by including an RLC PDU 1, which is configured by concatenating a PDCP PDU 1 of 200 bytes with a partial PDCP PDU 2 of 100 bytes, in the MAC PDU 1 [S1330]. The MAC layer transmits a MAC PDU 2 by adding padding as much as 100 bytes to an RLC PDU 2 configured by a partial PDCP PDU 2 of the remaining 100 bytes [S1350]. In particular, since concatenation and segmentation are permitted in the logical channel 2, when a UE configures an RLC PDU, the UE concatenates/segments a plurality of PDCP PDU data to satisfy RLC PDU requested by the MAC layer and includes data in the RLC PDU as much as possible.

Figure 14:
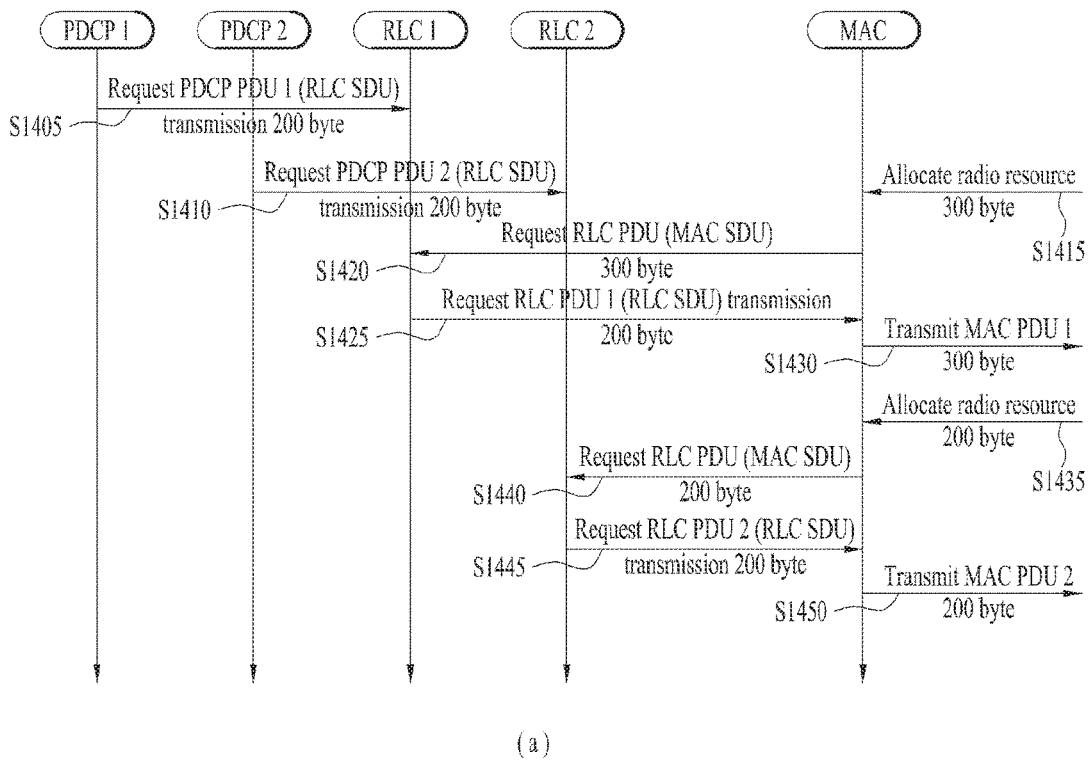
FIG. 14 is a flowchart for an operation method of a UE according to a layer in accordance with a further different proposed embodiment.
Figure 14:
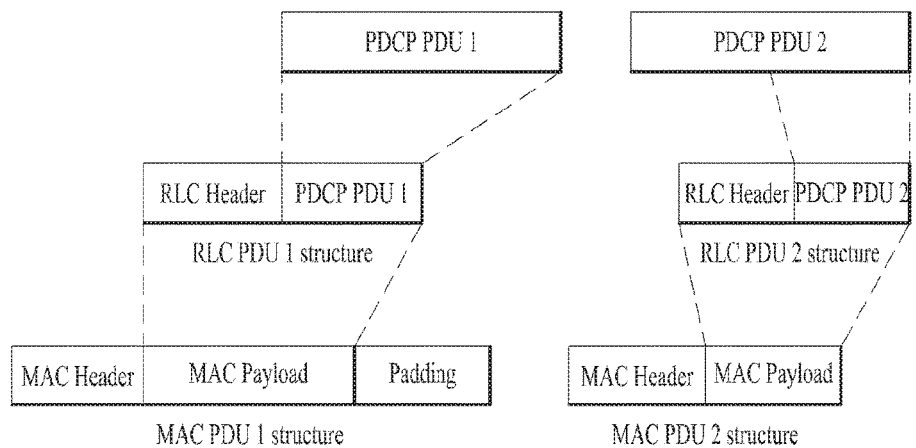
Figure 15:
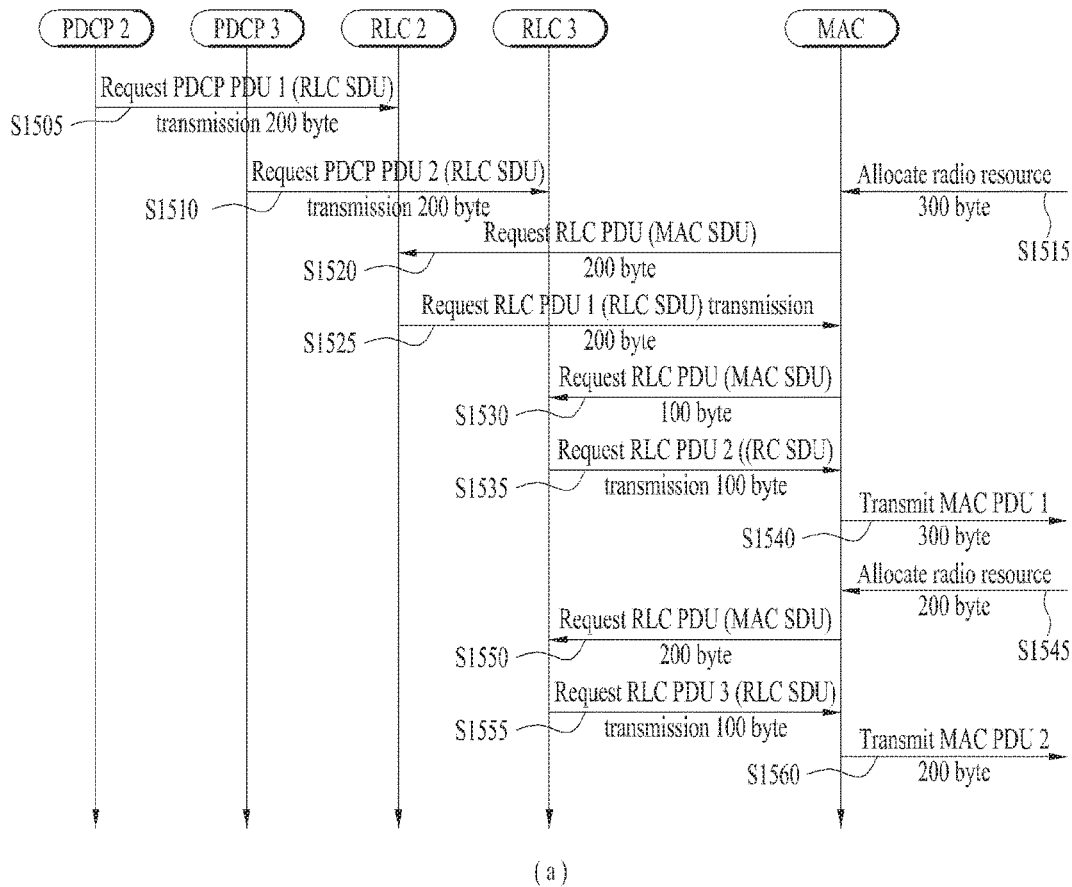
FIG. 15 is a flowchart for an operation method of a UE according to a layer in accordance with a further different proposed embodiment.
Figure 15:
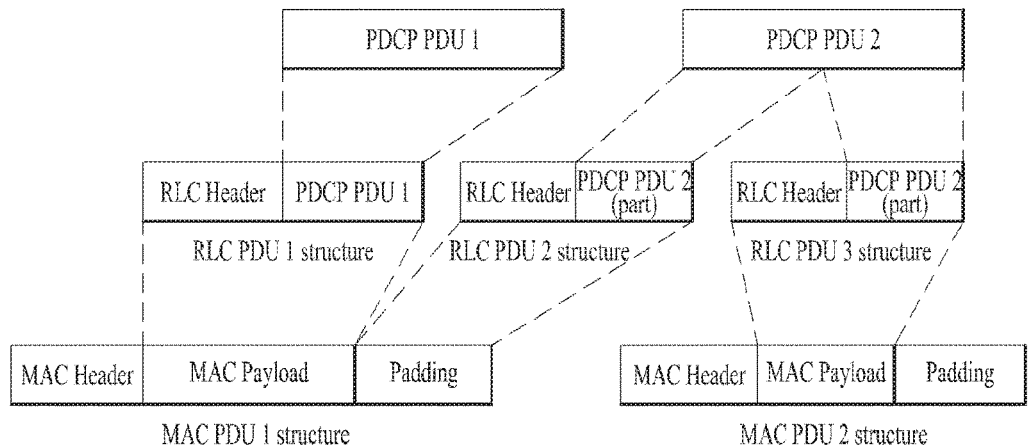

FIGS. 14(a) and (b) show data transmission processes of the logical channels 1 and 2. Since multiplexing is banned in the logical channel 1, although an available space is remained in a MAC PDU 1 of 300 bytes, data of the logical channel 2 is not included in the MAC PDU 1 (FIG. 14(b)). In particular, in FIG. 14, since multiplexing is banned in the logical channel 1, although multiplexing is permitted in the logical channel 2 which is transmitted together with the logical channel 1, a result similar to a result of FIGS. 12(a) and (b) occurs.

FIGS. 15(a) and (b) show data transmission processes of the logical channels 2 and 3. Since multiplexing is permitted in the logical channels 2 and 3 and a space as much as 100 bytes is left over even after a MAC PDU 1 is filled with data of the logical channel 2, a partial data of the logical channel 3 of 100 bytes is included in the MAC PDU 1. The remaining data except the partial data included in the MAC PDU 1 is included in the MAC PDU 2 in the logical channel 3.

In the foregoing description, a case that configuration information of each layer is related to a V2X scenario has been explained. Yet, the present invention and the embodiment are not restricted to a V2X service or a V2X application only. In particular, when an eNB forwards information on a protocol/layer of a UE via RRC signaling, the eNB can transmit the information in a manner of including configuration information on an operation and a function of each protocol/layer in the information. For example, RRC signal can include information on whether or not an RLC entity is able to perform segmentation/concatenation as configuration information of the RLC entity and information on whether or not a MAC entity is able to perform multiplexing as configuration information of the MAC entity. Having received the configuration information, a UE configures each of protocol entities according to the configuration information and operates.

Meanwhile, when an eNB forwards configuration information to a UE, the eNB can also forward information related to a usage of each protocol entity to the UE together with the configuration information. For example, when the eNB forwards configuration information on an RLC entity to the UE, the eNB can inform the UE of information on whether or not the RLC entity is used for a V2X service together with the configuration information. In this case, the RLC entity designated for V2X can apply a function or an operation predetermined for the V2X service. The above-mentioned process can be performed in a manner of being similar to the process mentioned earlier in FIG. 11 performed by each of layers that applies a configuration value stored in advance.

And, the eNB and the UE exchange configuration information on a radio bearer or a protocol entity with each other via an RRC message. In this case, the eNB may inform the UE of information on whether or not a certain entity is designated for V2X or information on whether or not concatenation/segmentation/multiplexing is applied to a certain radio bearer. Table 3 in the following shows an example of implementing an RRC connection reconfiguration message.

TABLE 3

```
-- ASN1START
... ...
DRB-ToAddMod ::=   SEQUENCE {
    eps-BearerIdentity                  INTEGER  (0..15)
              OPTIONAL,         -- Cond DRB-Setup
    drb-Identity                        DRB-Identity,
        v2x-Bearer                      V2X-Bearer,
    Boolean
    segmentation                        Segmentation,
    Boolean
    concatenation                       Concatenation,
    Boolean
    pdcp-Config                         DCP-
    Config        OPTIONAL,             -- Cond PDCP
    rlc-Config                          RLC-Config
              OPTIONAL,         -- Cond SetupM
... ...
```

The RRC connection reconfiguration message shown in Table 3 includes configuration information of a radio bearer. The RRC connection reconfiguration message includes 'RRCConnectionReconfiguration-r8-IEs' IE (Information Element). The IE includes a 'RadioResourceConfigDedicated' parameter and the parameter includes 'SRB-ToAddModList' and 'DRB-ToAddModList' parameters. In this case, the 'DRB-ToAddModList' parameter includes information on eps-bearer and drb-bearer. In particular, the eNB can inform the UE that a bearer is going to be used for V2X by including information on the bearer in the information on the eps-bearer and the drb-bearer.

In addition to the abovementioned contents, the RRC connection reconfiguration message can further include information indicating whether or not a PDCP entity and an RLC entity set to a corresponding bearer are able to perform concatenation and segmentation. The eNB additionally informs the UE of information on whether or not concatenation/segmentation is applied to each bearer. By doing so, although information indicating whether or not a bearer is used for V2X is not informed according to a bearer, the eNB can indicate whether or not concatenation/segmentation is performed on a V2X-related data packet. If the UE is configured not to apply segmentation and concatenation to a V2X bearer all the time, since it is able to control an operation of the UE using information indicating a V2X bearer only, a field indicating whether or not concatenation/segmentation is performed may not be included in the RRC connection reconfiguration message.

Meanwhile, many applications exist in an application layer of a UE. In this case, if the application layer is separated from a communication layer, the communication layer is unable to know an application to which data received from the application layer belongs thereto. For example, when an LTE communication module is connected with a notebook computer using USB, a notebook application generates a random data at random timing and an operating system installed in the notebook forwards the data to the LTE communication module connected with the notebook via the USB. Hence, if an IP packet is forwarded to the LTE module only, it is difficult for the LTE module to know an application for which the IP packet is used and it is difficult for the LTE module to determine whether to apply the concatenation/segmentation.

In order to solve the problem above, the eNB (MME or P-GW) forwards information on matching between an IP packet and an application to the UE using information collected by the eNB or information on a service provided by the eNB. Information for determining an application related to a certain data in the communication layer and information on a bearer to which a forwarded data is mapped are referred to as TFT (traffic flow template). A network informs a UE of a bearer for transmitting data of a specific application based on the TFT and may also be able to inform the UE of information indicating whether or not segmentation/concatenation/multiplexing is permitted in the bearer.

Figure 16:
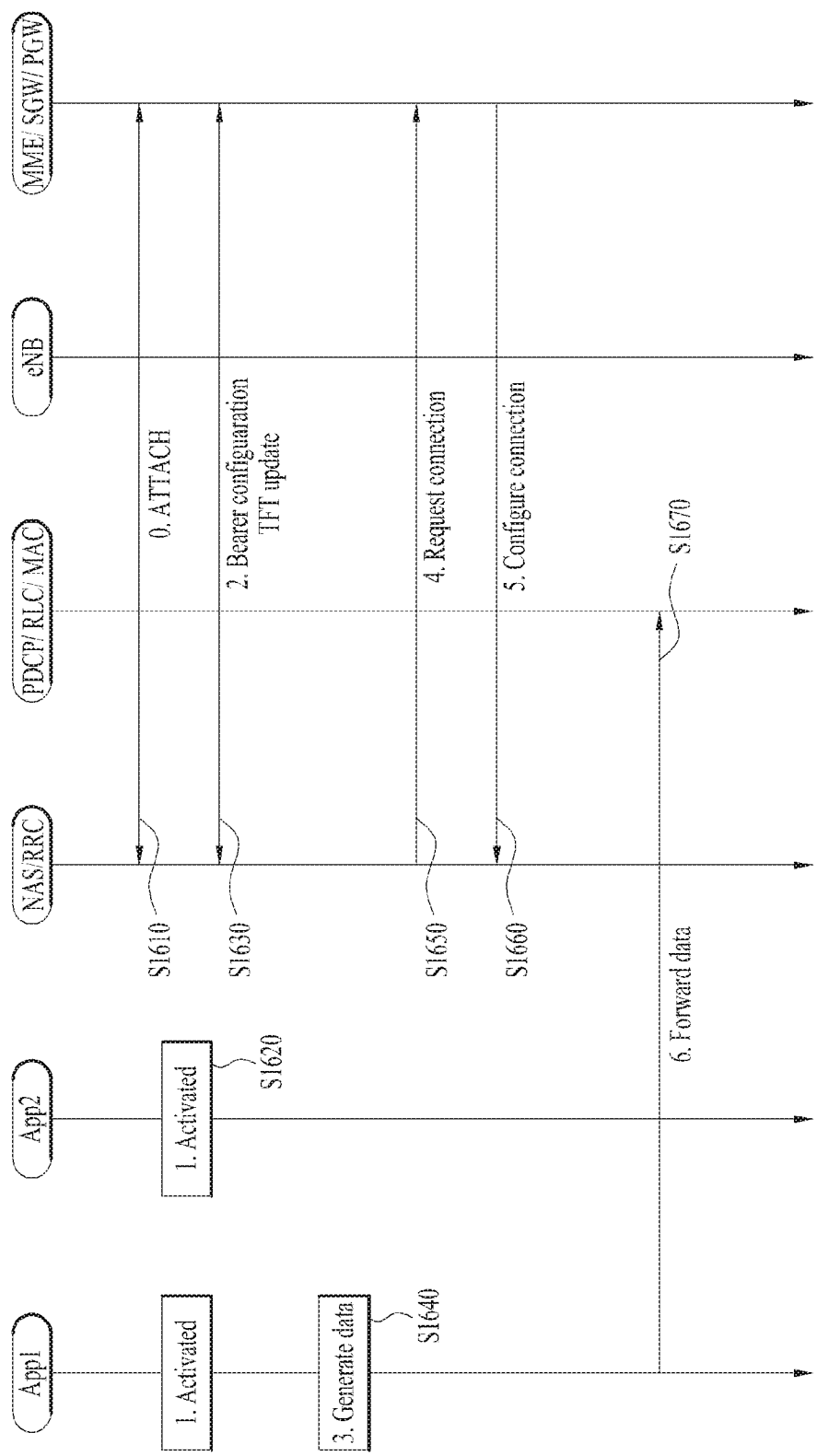
FIG. 16 is a flowchart for a UE to transmit V2X data according to a proposed embodiment.

As a different scheme, in case of performing V2X, since a V2X module is installed in a vehicle UE, when a V2X application generates a data and forwards the data to a communication module of the vehicle, it may be able to configure such a flag as a V2X data and forward the flag to the communication module of the vehicle together with the data. In particular, since a V2X data flag is not configured in a video streaming application, the communication module can determine whether or not the forwarded data corresponds to a V2X data using the flag. FIG. 16 is a flowchart for a UE to transmit V2X data according to the proposed embodiment.

First of all, the UE performs an access procedure to establish a connection with a network [S1610]. If applications of the UE are activated [S1620], the network generates an EPS bearer in consideration of the applications activated in the UE [S1630]. The network can transmit information indicating a mapping relation between the EPS bearer and application data to the UE. The information can be transmitted to the UE in a form of the aforementioned V2X bearer configuration information or TFT-related information. The UE is able to know that data of a specific application is forwarded to the UE via a specific bearer or a logical channel based on the received information.

Subsequently, if data of an application 1 is generated [S1640], the UE requests a connection configuration to the network to forward the generated data [S1650]. The network sets a connection to the UE [S1660] and delivers detail information on the connection to the UE. The information can include configuration information on each of a logical channel, a PDCP layer, an RLC layer, and a MAC layer. For example, configuration information indicating whether or not concatenation/segmentation/multiplexing is performed on a logical channel or each of the layers can be forwarded to the UE. Subsequently, the UE forwards a data generated in a specific application to each of the PDCP layer, the RLC layer, and the MAC layer [S1670] and data processed according to the configuration information is forwarded to the network entity.

According to the aforementioned contents, when a data of a specific application is processed, if concatenation/segmentation/multiplexing is selectively performed according to a layer, it is able to perform QoS management appropriate for the characteristic of the application.

5. V2X Communication Method of UE Proposed in V2X Scenario

In the following, a problem capable of being occurred in a V2X scenario and V2X communication environment and a V2X communication method performed by a UE to reduce the problem are proposed.

5.1 Embodiment 2

Figure 17:
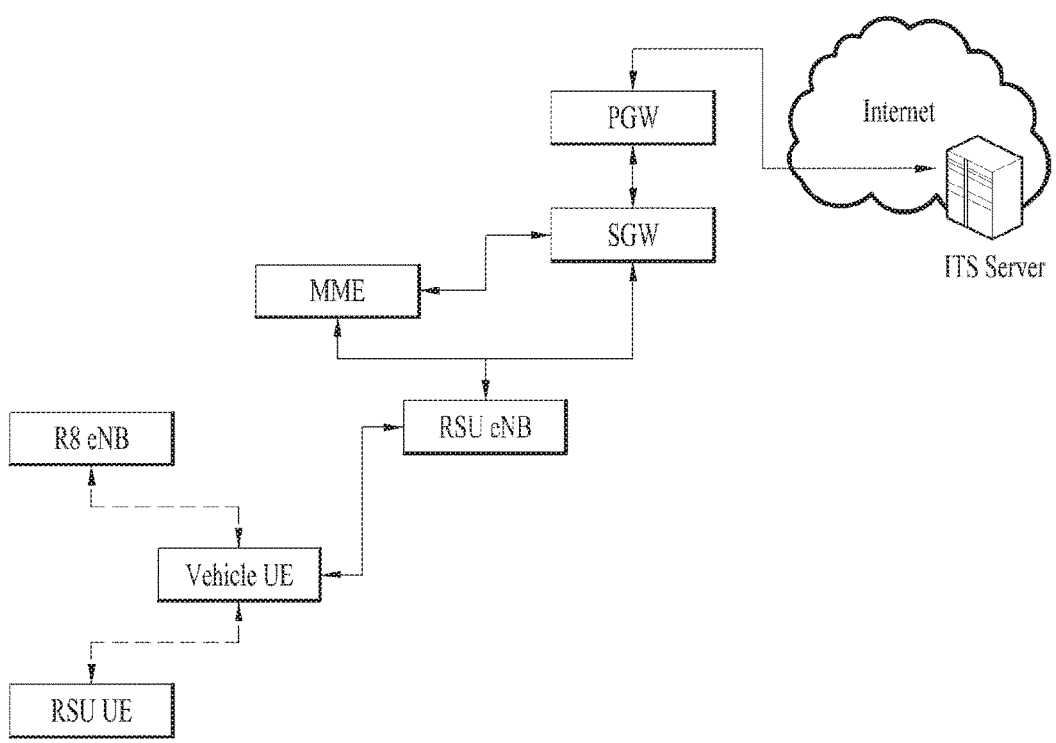
FIG. 17 is a diagram illustrating V2X network architecture according to a different proposed embodiment.

FIG. 17 is a diagram illustrating V2X network architecture according to a different proposed embodiment. A vehicle UE directly performs communication with an application (e.g., ITS (intelligent transport system)) server via an RSU eNB to exchange information with the application server. As show in in FIG. 17, as a simplest implementation scheme for the vehicle UE to transceive information with the ITS server, the UE may possess an address of the ITS server in advance via a preset configuration. In particular, when a manufacturer ships the vehicle UE, information of the ITS server is set to the UE and the UE uses the information stored in the UE in advance when the UE operates.

Yet, when an actual network deployment structure is considered, the abovementioned implementation scheme has limits. First of all, there is a limit in a region managed by the ITS server. In particular, since it is essential to reduce delay time for such information sensitive to time as traffic safety, there is a limit in covering all regions of a country by a fixed ITS server. In particular, if the number of subscribers subscribing to a V2X service increases as time goes by, it is more difficult for one fixed ITS server to cover the load of the service. And, for example, it is not necessary for a vehicle located at Busan to receive information on traffic status of Seoul. In particular, it is necessary to set a limit on a region managed by one ITS server. Hence, there is a limit in allocating information on a fixed ITS server to a UE in advance. As a result, it may be able to anticipate a deployment structure of network entities shown in FIG. 18. According to the structure shown in FIG. 18, an ITS server is deployed in a form of a local server that covers a prescribed local area. The local server is deployed in a manner of being separated from each other according to a condition such as RTT (round trip time), a type of interested information, and the like.

Figure 18:
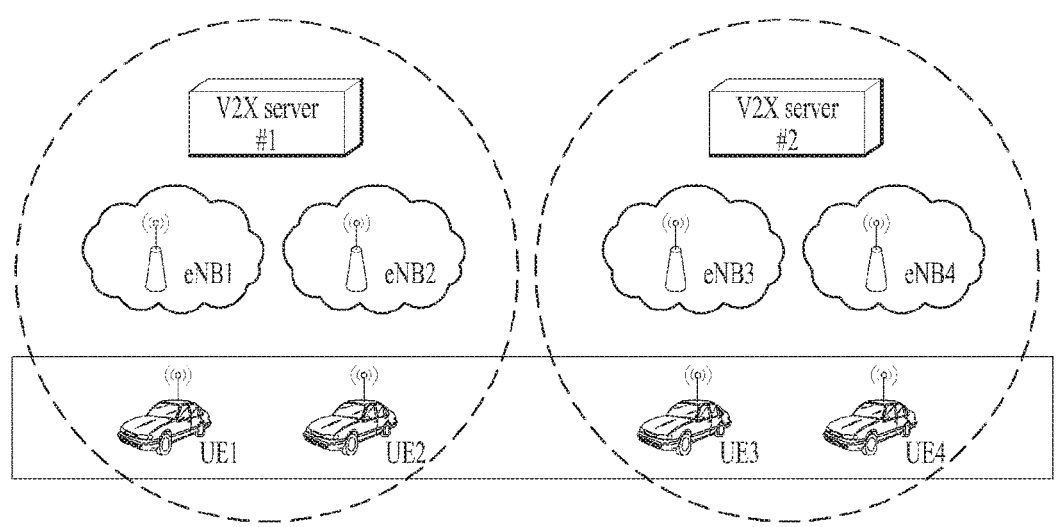
FIG. 18 is a diagram illustrating deployment of network entities in a proposed V2X scenario.

Referring to FIG. 18, a UE enters a new area while moving along the road. In this case, a separate V2X server exists in every new area. In particular, when a vehicle UE moves fast, it is necessary to quickly discover a V2X server and receive V2X-related traffic information. In other word, it is necessary to enhance a scheme for a UE to identify an address of a local ITS server while the UE is moving.

An operation process of a vehicle UE in the abovementioned environment is explained in detail. First of all, the UE selects a cell on which the UE to camp. In this case, the UE may preferentially consider camping on an RSU eNB. In particular, in a cell selection procedure, the UE preferentially selects a cell transmitting information indicating that the cell supports a V2X function or an ITS function and may be then able to camp on the selected cell. Having selected the cell, the UE performs an access procedure or a TAU (tracking area update) procedure. An address of an ITS server can be indicated to the UE via the access procedure or the TAU procedure.

If a registration procedure is not performed yet, the UE performs the registration procedure for registering at the ITS server. In this case, a network node (e.g., MME) can forward the address of the ITS server to the UE via the access procedure (e.g., a TAU procedure, an SR (service request) procedure, an attach request procedure, etc.) or a PDN connectivity establishment procedure. Or, the UE may directly obtain the address of the ITS server via a DNS query. Or, a network node (e.g., eNB) may inform the UE of the address of the ITS server via an SIB.

The ITS server verifies and permits the registration procedure of the vehicle UE and checks information (subscription) of the UE using a database of the ITS server or a database of a different server (e.g., HSS server). A network may check ITS service-related information of the UE via the access procedure of the UE. And, the ITS server stores context information of the UE via the registration procedure. In order for the ITS server to transmit unicast/multicast data to the UE, the context information of the UE can be implemented by a scheme of storing an IP address of the UE.

The ITS server informs the UE of a result of the registration procedure and may indicate the UE to transmit certain information to the ITS server in a certain situation. The vehicle UE transmits information to the ITS server according to a situation and a condition indicated by the ITS server and the ITS server also transmits information to the UE.

According to the abovementioned embodiment, a fast moving vehicle UE is able to promptly knows an address of an ITS server which is implemented in a form of a local server. Hence, the UE is able to initiate communication with the separately implemented ITS server via a simple procedure.

5.2 Embodiment 3

Figure 19:
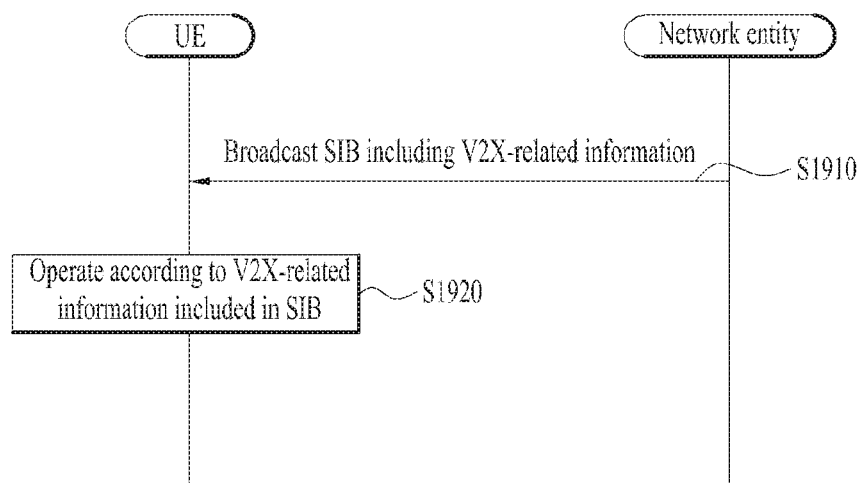
FIG. 19 is a flowchart for a V2X communication method of a UE according to a different proposed embodiment.

FIG. 19 is a flowchart for a V2X communication method of a UE according to a different proposed embodiment.

In general, a cell providing LTE/LTE-A service becomes a unit of providing a communication service to individuals in a manner that a network service provider installs a base station matched with a specific frequency. Hence, all cells should be provided to a user subscribing to the cells except a case that the service provider tests a specific cell.

Yet, if a specific frequency band is designated for the usage of V2X only, in particular, if the specific frequency band is allocated for the usage of a national policy, it is unable to provide a different service rather than a V2X service in the specific frequency band. As a result, although there is no difference in the aspect of transmitting an SIB in a cell, other UEs (e.g., normal smartphone) except a V2X UE should not stay in a cell allocated for the usage of V2X.

Hence, in order to prevent a problem that a non-V2X UE rather than a V2X UE camps on a V2X cell or a V2X frequency, it is necessary for a cell to inform a UE of the usage of the cell. In particular, if the non-V2X UE camps on a cell incapable of providing a service to the non-V2X UE, the non-V2X UE is able to receive no data until the non-V2X UE receives a service reject message from the cell. In particular, in order to prevent a service gap, it is necessary for a cell to inform a UE of the usage of the cell. By doing so, it may be able to prevent unnecessary signaling overhead and resource waste.

V2X corresponds to a technology for performing communication between vehicles based on LTE/LTE-A technology. Hence, if the V2X is supported in a cell, the cell also supports a user of a normal terminal such as a smartphone. Yet, since a V2X service corresponds to a service for performing a common good such as anti-collision between vehicles, it is necessary to guarantee strict QoS to a user using the V2X service. For example, if it is expected that a collision occurs between vehicles, information notifying the collision should be immediately transmitted and received. In order to guarantee the strict QoS, specific service providers may intend to block the approach of a UE of a normal user (a user of a non-V2X UE) approaching to a frequency used for the usage of V2X.

According to a current LTE/LTE-A communication standard, a service provider may be able to block access of a UE intending to access a cell using two methods. As a first method, the service provider can transmit information such as 'barred' via an SIB of a cell. Although the first method is able to block the access of the non-V2X UE user, since the first method blocks access of all UEs, access of a V2X UE user is blocked as well.

As a second method, a service provider can configure a state of a cell with such a state as 'reserved for operator use'. According to the second method, an AC (access class) value set to USIM of a UE makes only UEs configured by a specific value (11 or 15) access a cell. If the AC value 11 or 15 is set USIM of a UE, the UE corresponds to a UE having a restricted AC designed to manage a network of a service provider. According to the second method, a UE of a vehicle related to a service provider may access a cell only.

In order to solve the abovementioned problem, a method of transmitting a V2X-dedicated status value to a UE in each cell is proposed in the following. According to the embodiment proposed in the present invention, each cell indicates whether the cell provides normal connectivity service or not. Each cell indicates whether UEs not supporting V2X service can camp on or not. For example, if a cell indicates that only UEs for V2X can camp on, other UE such as smartphone without V2X function should not select/camp on that cell. In this case, UEs not supporting V2x service regards the cell as prohibited or unacceptable cell, not suitable cell.

Preferably, each cell indicates whether the cell is for V2X or not. For example, if a cell indicates that it is a cell for V2X, other UE which does not support V2X should not select/camp on that cell. In this case, UEs not supporting V2x service regards the cell as prohibited or acceptable cell, not suitable cell. Preferably, when System Information Block Type 2 is not broadcast, UE which is not subscribed to V2X service does not camp on the cell.

As mentioned in the foregoing description, Table 4 in the following shows an embodiment of implementing a process of broadcasting the V2X-dedicated status value using an SIB type 1 in each cell.

TABLE 4

-- ASN1START
......
    PLMN-IdentityInfo ::=        SEQUENCE {
        plmn-Identity
        PLMN-Identity,
        cellReservedForOperatorUse
        ENUMERATED {reserved, notReserved}
    CellReservedForV2XUse     ENUMERATED
    {reserved, notReserved}
}
......

According to the aforementioned embodiment, since information on whether or not a cell corresponds to a cell for V2X is indicated to system information broadcasted via the cell, it may be able to distinguish a UE supporting V2X from a non-V2X UE and it may be able to configure only the UE supporting V2X to camp on the cell.

6. Device Configurations

Figure 20:
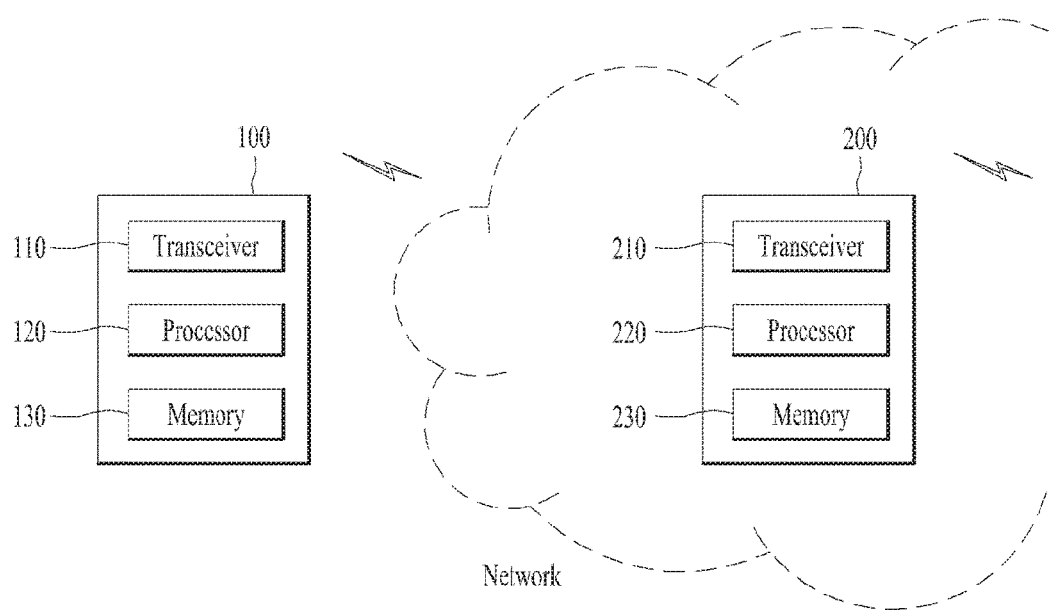
FIG. 20 is a diagram illustrating a configuration of a node device according to a proposed embodiment.

FIG. 20 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 20, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

Although the operation method of a UE and the V2X communication method are described centering on examples applied to 3GPP LTE system, it may also be applicable to various wireless communication systems including IEEE 802.16x and 802.11x system. Moreover, the proposed method can also be applied to mmWave communication system using a microwave frequency band.

What is claimed is:

1. A method of performing communication, which is performed by a user equipment (UE) with a network entity in a wireless communication environment, the method comprising:
receiving protocol entity configuration information from the network entity;
receiving a service data unit (SDU) requested by an application of the UE in a first protocol entity of the UE;
generating a first protocol data unit (PDU) in the first protocol entity according to the protocol entity configuration information indicating an operation of the first protocol entity without performing concatenation or segmentation on the SDU;
forwarding the first protocol PDU to a second protocol entity from the first protocol entity;
generating a second protocol PDU in the second protocol entity based on the first protocol PDU; and
transmitting the second protocol PDU to the network entity in a third protocol entity of the UE,
wherein the protocol entity configuration information indicates one of:
whether or not two or more first protocol SDUs are included in the first protocol PDU,
whether or not a first protocol SDU is included in two or more first protocol PDUs in a manner of being divided,
whether or not two or more second protocol SDUs, which are received from first protocol entities different from each other, are included in one second protocol PDU,
how often the first protocol entity forwards the first protocol PDU to the second protocol entity, or
whether or not the second protocol entity applies multiplexing differently according to a logical channel.

2. The method of claim 1, wherein the first protocol entity corresponds to a radio link control (RLC) layer, wherein the second protocol entity corresponds to a medium access control (MAC) layer, and wherein the third protocol entity corresponds to a physical (PHY) layer.

3. The method of claim 1, wherein the protocol entity configuration information is received via dedicated radio resource control (RRC) signaling.

4. The method of claim 1, wherein the communication environment corresponds to a vehicle to everything (V2X) communication environment, wherein the application corresponds to a V2X application, and wherein the protocol entity configuration information corresponds to V2X configuration information.

5. A method of performing communication, which is performed by a user equipment (UE) with a network entity in a wireless communication environment, the method comprising:
receiving protocol entity configuration information from the network entity;
receiving a service data unit (SDU) requested by an application of the UE in a first protocol entity of the UE;
generating a first protocol data unit (PDU) in the first protocol entity based on the SDU;
forwarding the first protocol PDU to a second protocol entity from the first protocol entity;
generating a second protocol PDU in the second protocol entity according to the protocol entity information indicating an operation of the second protocol entity without performing multiplexing on the first protocol PDU; and
transmitting the second protocol PDU to the network entity in a third protocol entity of the UE,
wherein the protocol entity configuration information indicates one of:
whether or not two or more first protocol SDUs are included in the first protocol PDU,
whether or not a first protocol SDU is included in two or more first protocol PDUs in a manner of being divided,
whether or not two or more second protocol SDUs, which are received from first protocol entities different from each other, are included in one second protocol PDU,
how often the first protocol entity forwards the first protocol PDU to the second protocol entity, or
whether or not the second protocol entity applies multiplexing differently according to a logical channel.

6. A user equipment (UE) performing communication with a network entity in a vehicle to everything (V2X) communication environment, the UE comprising:
a transmitter;
a receiver; and
a processor that operates in a manner of being connected with the transmitter and the receiver,
wherein the processor:
receives protocol entity configuration information from the network entity,
receives a service data unit (SDU) requested by an application of the UE in a first protocol entity of the UE,
generates a first protocol data unit (PDU) in the first protocol entity according to the protocol entity configuration information indicating an operation of the first protocol entity without performing concatenation or segmentation on the SDU,
forwards the first protocol PDU to a second protocol entity from the first protocol entity,
generates a second protocol PDU in the second protocol entity based on the first protocol PDU, and
transmits the second protocol PDU to the network entity in a third protocol entity of the UE,
wherein the protocol entity configuration information indicates one of:
whether or not two or more first protocol SDUs are included in the first protocol PDU, whether or not a first protocol SDU is included in two or more first protocol PDUs in a manner of being divided, whether or not two or more second protocol SDUs, which are received from first protocol entities different from each other, are included in one second protocol PDU, how often the first protocol entity forwards the first protocol PDU to the second protocol entity, or whether or not the second protocol entity applies multiplexing differently according to a logical channel.

7. A user equipment (UE) performing communication with a network entity in a vehicle to everything (V2X) (vehicle to everything) communication environment, the UE comprising:

a transmitter;

a receiver; and a processor that operates in a manner of being connected with the transmitter and the receiver, wherein the processor:

receives protocol entity configuration information from the network entity, receives a service data unit (SDU) requested by an application of the UE in a first protocol entity of the UE, generates a first protocol data unit (PDU) in the first protocol entity based on the SDU, forwards the first protocol PDU to a second protocol entity from the first protocol entity, generates a second protocol PDU in the second protocol entity according to the protocol entity information indicating an operation of the second protocol entity without performing multiplexing on the first protocol PDU, and transmits the second protocol PDU to the network entity in a third protocol entity of the UE, wherein the protocol entity configuration information indicates one of:

whether or not two or more first protocol SDUs are included in the first protocol PDU, whether or not a first protocol SDU is included in two or more first protocol PDUs in a manner of being divided, whether or not two or more second protocol SDUs, which are received from first protocol entities different from each other, are included in one second protocol PDU, how often the first protocol entity forwards the first protocol PDU to the second protocol entity, or whether or not the second protocol entity applies multiplexing differently according to a logical channel.

* * * * *